US008649386B2

(12) United States Patent  (10) Patent No.: US 8,649,386 B2
Ansari et al. (45) Date of Patent: Feb. 11, 2014

(54) MULTI-INTERFACE WIRELESS ADAPTER AND NETWORK BRIDGE

(75) Inventors: Amir Ansari, Plano, TX (US); Allen Y. Tong, Plano, TX (US); George A. Cowgill, Farmersville, TX (US); Leon E. Nicholls, Plano, TX (US); Jude P. Ramayya, Wylie, TX (US); Ramprakash Masina, Wylie, TX (US); Atousa Raissyan, Potomac, MD (US); Alvin R. McQuarters, Euless, TX (US)

(73) Assignee: Prodea Systems, Inc, Plano, TX (US)

( * ) Notice: Subject to any disclaimer, the term of this patent is extended or adjusted under 35 U.S.C. 154(b) by 953 days.

(21) Appl. No.: 11/900,368

(22) Filed: Sep. 11, 2007

(65) Prior Publication Data

US 2009/0067441 A1  Mar. 12, 2009

(51) Int. Cl.
*H04L 12/28* (2006.01)
*H04L 12/56* (2011.01)

(52) U.S. Cl.
USPC .......................................................... 370/401

(58) Field of Classification Search
USPC .......................................................... 370/401
See application file for complete search history.

(56) References Cited

U.S. PATENT DOCUMENTS

| | | | |
|---|---|---|---|
| 5,867,666 A * | 2/1999 | Harvey | 709/239 |
| 6,301,609 B1 | 10/2001 | Aravamudan et al. | |
| 6,330,599 B1 * | 12/2001 | Harvey | 709/223 |
| 6,487,646 B1 | 11/2002 | Adams et al. | |
| 6,526,581 B1 | 2/2003 | Edson | |
| 6,681,232 B1 | 1/2004 | Sistanizadeh et al. | |
| 6,735,619 B1 | 5/2004 | Sawada | |
| 6,898,276 B1 | 5/2005 | Millet et al. | |
| 6,930,598 B2 | 8/2005 | Weiss | |
| 6,957,275 B1 | 10/2005 | Sekiguchi | |
| 6,961,335 B1 | 11/2005 | Millet et al. | |
| 6,965,614 B1 | 11/2005 | Osterhout et al. | |
| 7,035,270 B2 | 4/2006 | Moore, Jr. et al. | |

(Continued)

FOREIGN PATENT DOCUMENTS

WO  WO-2008/082441  7/2008
WO  WO-2008/083384  7/2008

(Continued)

OTHER PUBLICATIONS

Intel, "Delivering on the Promise of Triple Play Digital Media", Technology Backgrounder, Consumer Electronics, © 2004, pp. 1-4.

(Continued)

*Primary Examiner* — Suk Jin Kang
(74) *Attorney, Agent, or Firm* — Luis M. Ortiz; Kermit D. Lopez; Ortiz & Lopez, PLLC

(57) ABSTRACT

Among other things, a wireless device is disclosed for enabling communication with a gateway device within a user premises. The wireless device includes a wireless local area network transceiver for bidirectional wireless data communication at the premises, an interface for wired communication, a processor for converting data between the wireless and wired interfaces. The wireless device receives instructions from the gateway device via the transceiver or the interface and implements conversion and communication control functions to implement a selected one of a plurality of wireless-wired adaptations for communications flowing between the selected one of the transceiver and the interface and the other of the transceiver and the interface for communication within the user premises for application service delivered by the gateway device.

19 Claims, 10 Drawing Sheets

(56) References Cited

U.S. PATENT DOCUMENTS

| | | | |
|---|---|---|---|
| 7,075,919 B1 | 7/2006 | Wendt et al. | |
| 7,207,048 B2 | 4/2007 | McQuillan et al. | |
| 7,948,992 B1 * | 5/2011 | Holmgren et al. | 370/395.53 |
| 7,987,490 B2 | 7/2011 | Ansari et al. | |
| 8,189,608 B2 * | 5/2012 | Duo et al. | 370/401 |
| 8,315,266 B1 * | 11/2012 | Lam et al. | 370/401 |
| 2002/0023131 A1 | 2/2002 | Wu et al. | |
| 2002/0136226 A1 * | 9/2002 | Christoffel et al. | 370/401 |
| 2002/0176404 A1 | 11/2002 | Girard | |
| 2003/0112755 A1 * | 6/2003 | McDysan | 370/230 |
| 2003/0126207 A1 | 7/2003 | Creamer et al. | |
| 2003/0140103 A1 | 7/2003 | Szeto et al. | |
| 2003/0210770 A1 | 11/2003 | Krejcarek | |
| 2003/0231641 A1 * | 12/2003 | Ryoo | 370/401 |
| 2004/0001480 A1 | 1/2004 | Tanigawa et al. | |
| 2004/0047310 A1 * | 3/2004 | Chen et al. | 370/329 |
| 2004/0047358 A1 * | 3/2004 | Chen et al. | 370/401 |
| 2004/0213273 A1 | 10/2004 | Ma | |
| 2004/0218609 A1 | 11/2004 | Foster et al. | |
| 2004/0255326 A1 | 12/2004 | Hicks, III et al. | |
| 2005/0038875 A1 | 2/2005 | Park | |
| 2005/0089052 A1 * | 4/2005 | Chen et al. | 370/401 |
| 2005/0108091 A1 | 5/2005 | Sotak et al. | |
| 2005/0232284 A1 * | 10/2005 | Karaoguz et al. | 370/401 |
| 2005/0249196 A1 | 11/2005 | Ansari et al. | |
| 2005/0286466 A1 | 12/2005 | Tagg et al. | |
| 2006/0025132 A1 | 2/2006 | Karaoguz et al. | |
| 2006/0031406 A1 | 2/2006 | Watson et al. | |
| 2006/0209857 A1 | 9/2006 | Hicks, III | |
| 2006/0259584 A1 | 11/2006 | Watson et al. | |
| 2007/0049342 A1 | 3/2007 | Mayer et al. | |
| 2007/0058608 A1 * | 3/2007 | Lin | 370/352 |
| 2007/0100981 A1 | 5/2007 | Adamczyk et al. | |
| 2008/0101320 A1 * | 5/2008 | Krahn et al. | 370/342 |
| 2008/0165789 A1 | 7/2008 | Ansari et al. | |
| 2008/0189774 A1 | 8/2008 | Ansari et al. | |
| 2009/0037382 A1 | 2/2009 | Ansari et al. | |
| 2009/0070229 A1 | 3/2009 | Ansari et al. | |
| 2009/0168787 A1 | 7/2009 | Ansari et al. | |
| 2010/0071053 A1 | 3/2010 | Ansari et al. | |
| 2010/0202450 A1 | 8/2010 | Ansari et al. | |
| 2010/0205152 A1 | 8/2010 | Ansari et al. | |
| 2010/0205301 A1 | 8/2010 | Ansari et al. | |
| 2010/0217837 A1 | 8/2010 | Ansari et al. | |
| 2010/0231790 A1 | 9/2010 | Ansari et al. | |
| 2010/0235433 A1 | 9/2010 | Ansari et al. | |
| 2010/0241711 A1 | 9/2010 | Ansari et al. | |
| 2010/0241748 A1 | 9/2010 | Ansari et al. | |

FOREIGN PATENT DOCUMENTS

| | | |
|---|---|---|
| WO | WO-2008/083385 | 7/2008 |
| WO | WO-2008/083387 | 7/2008 |
| WO | WO-2008/083391 | 7/2008 |
| WO | WO-2008/085201 | 7/2008 |
| WO | WO-2008/085202 | 7/2008 |
| WO | WO-2008/085203 | 7/2008 |
| WO | WO-2008/085204 | 7/2008 |
| WO | WO-2008/085205 | 7/2008 |
| WO | WO-2008/085206 | 7/2008 |
| WO | WO-2008/085207 | 7/2008 |
| WO | WO-2009/036088 | 3/2009 |
| WO | WO-2009/036185 | 3/2009 |
| WO | WO-2009/086134 | 7/2009 |

OTHER PUBLICATIONS

International Search Report and the Written Opinion of the International Searching Authority issued in International Application No. PCT/US 08/76036 dated on Nov. 14, 2008.

* cited by examiner

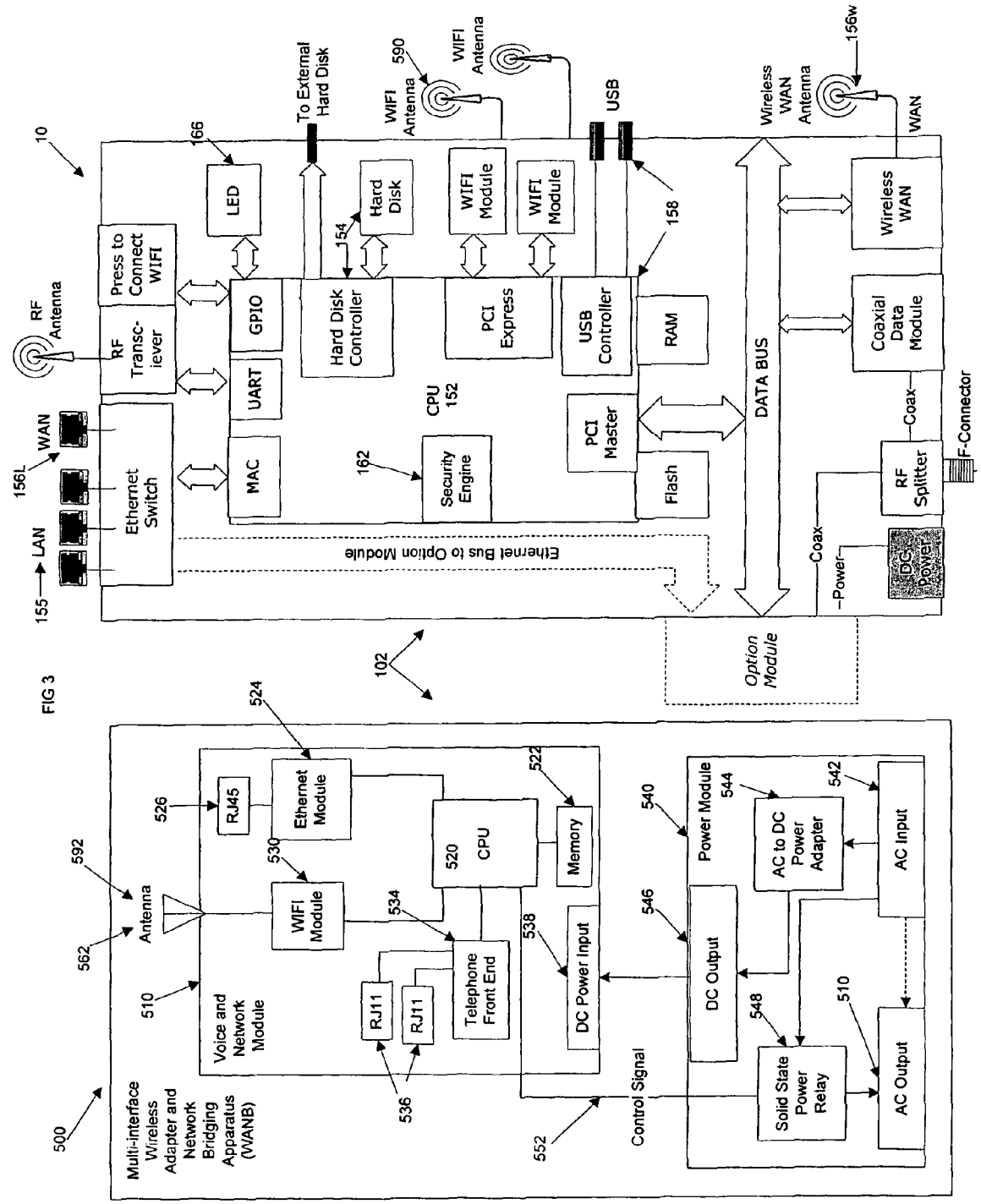

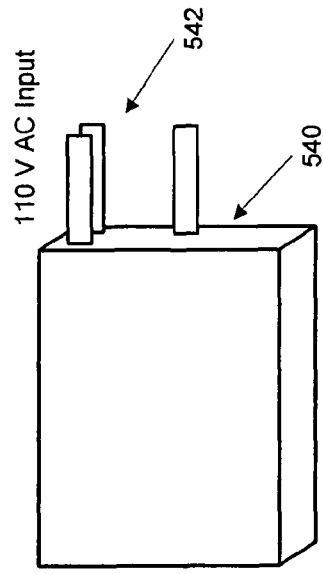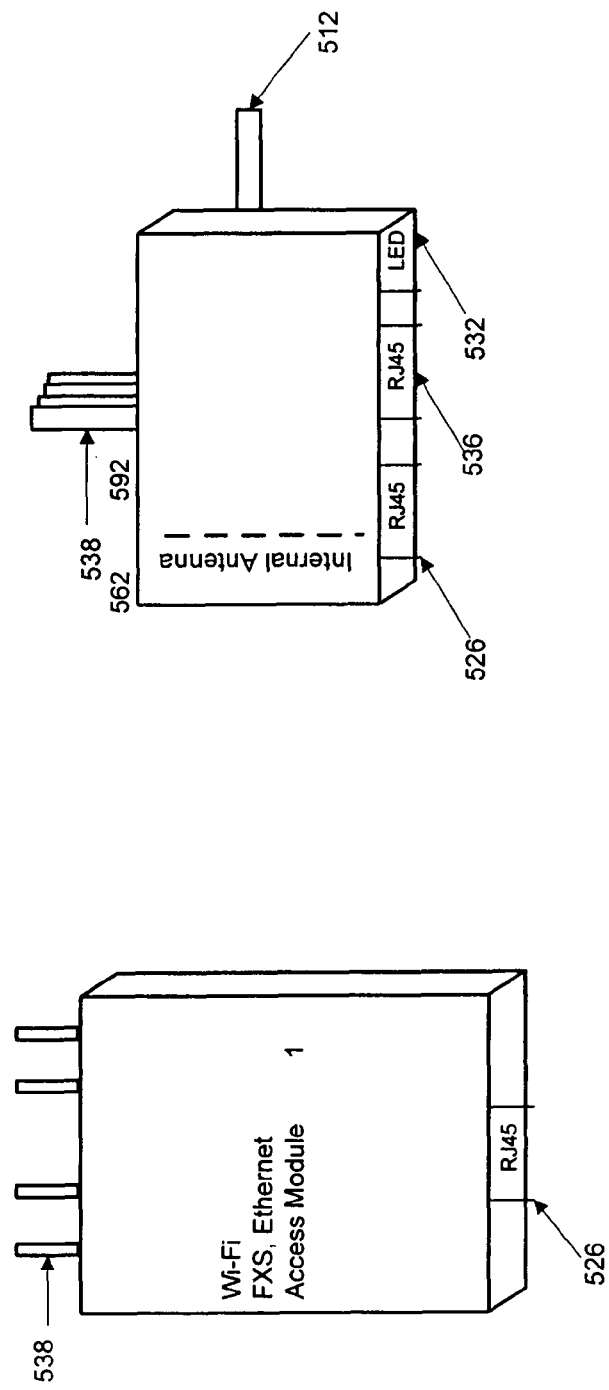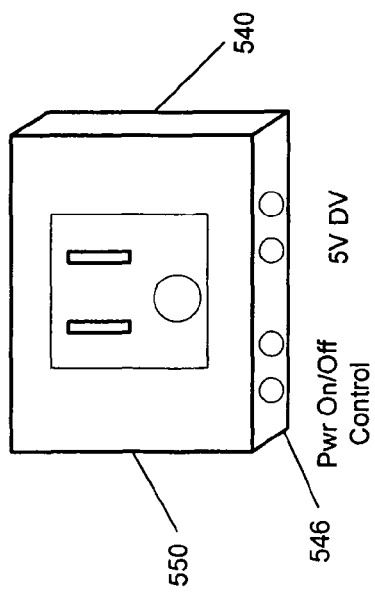

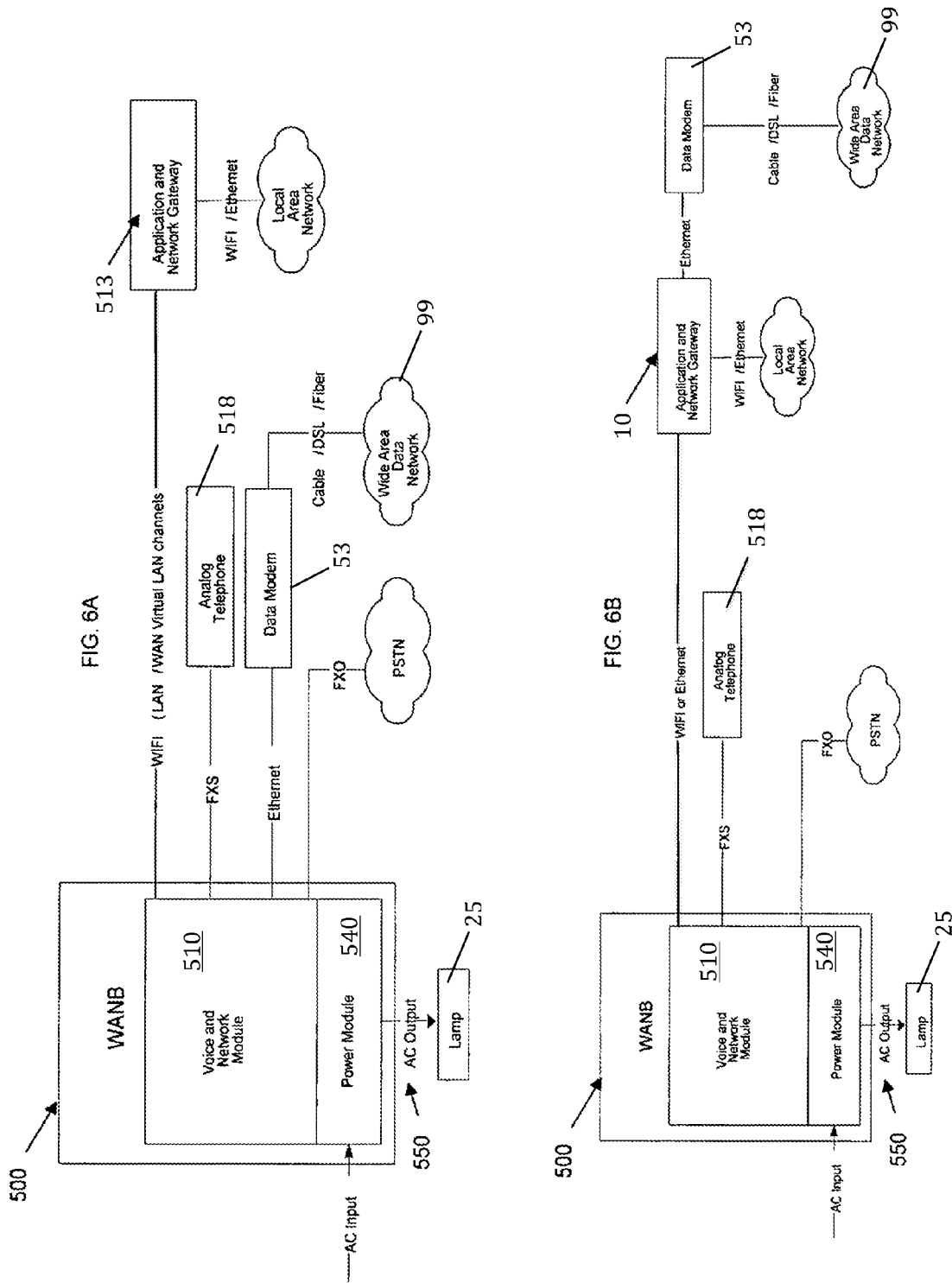

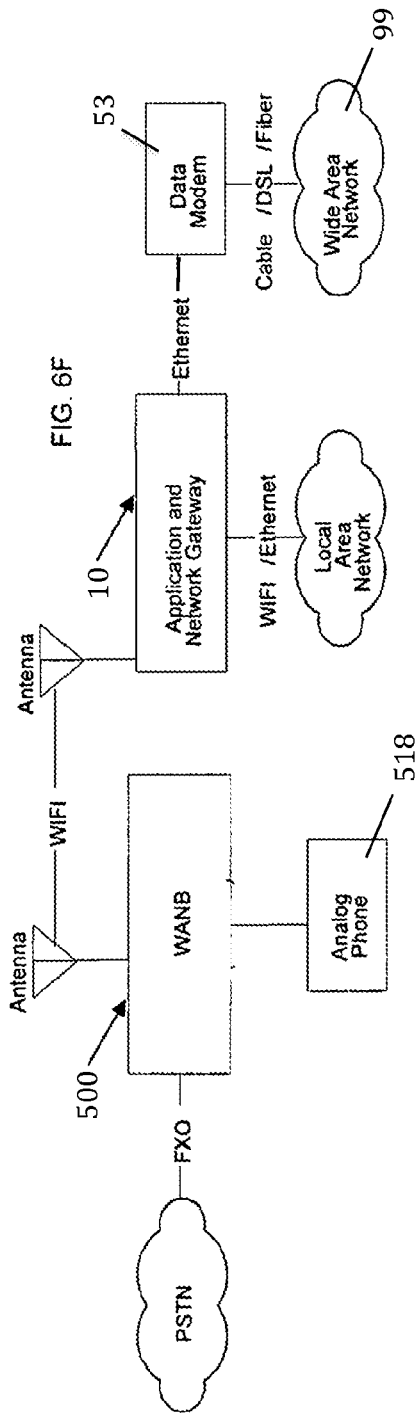
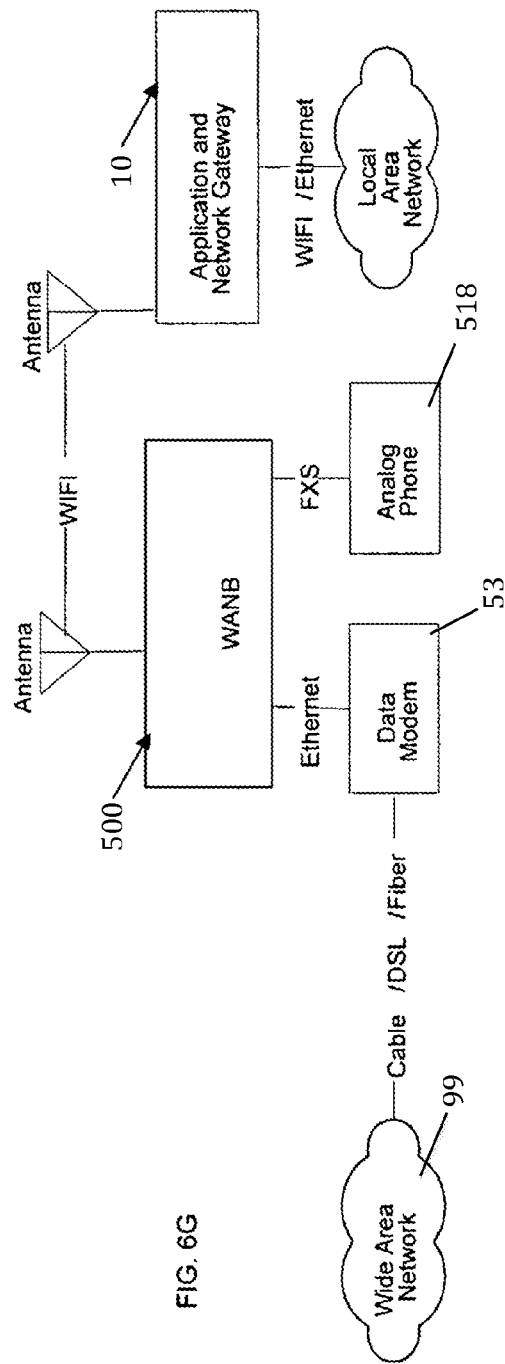
FIG. 6F
FIG. 6G

MULTI-INTERFACE WIRELESS ADAPTER AND NETWORK BRIDGE

TECHNICAL FIELD

The present subject matter relates to wireless devices and/or programming for such devices, to enable wireless communication with a gateway device providing application services from a user premises for endpoint devices.

BACKGROUND

The digital home is now becoming more complex with the myriad of new and emerging digital devices intended to address many user and consumer needs such as communication, entertainment, privacy and security, etc. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications. The protection of received Internet-sourced media content in addition to user-generated media content is additionally an important aspect that may be inadequately addressed by the technologically challenged user. With respect to Internet based data, most of the content delivery solutions are provided to the digital home networks through availability of the "two-foot" interface (i.e. the PC). It is relatively cumbersome to bring this content to the "ten-foot" interface (e.g. the television).

Although currently still cumbersome, devices exist to help users manage their digital devices. For example, some computers have been configured as standalone device management systems that manage the attached user devices (endpoint devices). Devices have also been offered that provide a gateway between a wide area network and customer premises systems, and some of those device enable a user to manage devices in the user premises remotely, and so on. However, with these computer/gateway devices comes a challenge of connecting to endpoint point devices and/or connecting the computer or gateway to the wide area network. Normally, a user premises houses only one (or a few at most) gateway device. The ease with which the user connects his endpoint devices to the gateway depends largely on the endpoint devices. For example, endpoint devices with only wired interfaces limit the location of the device within wire-reach of the gateway. As the gateway capability for managing multiple devices grow, so to does the number of cables and wires running from the devices to the gateway and/or between the gateway and the wide area network connection at the premises. Furthermore, the number of wired devices attachable to the gateway is limited to the number of ports available for the specific device. For example, for an endpoint device that uses an RJ45 interface, the user is limited to the number of endpoint devices as he has RJ45 ports on his gateway device. Often, devices are usually standardized to particular interfaces limiting the use of the interface to a particular class of devices.

The location of the devices is limited to the range of the gateway's antenna or the reach of the device's wires. As the signal degrades with distance, so to, does the quality of the connection and in some cases, the user experience. Often, the setup and management of these devices, especially wireless devices, remain daunting and intimidating for the non-technical user. Furthermore, in both the wired and wireless devices, interfaces evolve at different rates for different devices. Often, to employ the latest endpoint device on the market, the user may have to purchase a new gateway for the new interface card for the user's computer or gateway. However, the interfaces for some devices evolve very slowly creating a problem of an interface generation gap.

A need exists for techniques and/or devices to simplify the overall management of services and applications available to the digital home or even the small enterprise. There is an associated need to couple communications between the endpoint device and any gateway/management device deployed to simplify overall service/system management, and a related need to easily configure and manage communications with endpoint devices. Techniques or devices to address such needs should reduce the complexity of the maintenance, upgrading, and operation of even the more basic needs addressed by emerging digital endpoint devices and networks. Such techniques or devices should also reduce the complexity of delivering content to the "ten-foot" interface, and prepare for the technological evolution of the endpoints. However, such solutions must also address issues of communications between devices in the home in an effective seamless manner, often while minimizing or avoiding needs for new wiring or the like in the premises.

A need exists for a new paradigm, with improved convenience for the user and easier management for the application service provider. In that regard, it would be desirable to provide a multi-services application gateway device that provides not only a variety of IP-based communication services, but also offers a centralized management capability for application services. Additionally, it would be desirable to provide a communication bridge that provides a means to extend the logical and physical reach of such a gateway device, allow scalability of the service area, and allow easy upgrades of the services and applications provided by the gateway.

SUMMARY

The technology discussed herein may be embodied in wireless devices, typically for deployment at user premises, and/or to programming for devices that may function as such wireless extender devices. The technology also encompasses user premises systems, as may be formed by a wireless device and a gateway device. The wireless devices are implemented in such a manner as to offer communication with or in support of a gateway device within a user premises. The gateway device controls communication of one or more associated endpoint devices over a wide area data network to deliver an application service to the one or more associated endpoint devices, the service delivery includes at least some communication within the user premises.

Hence, in one example, the wireless device includes a wireless local area network transceiver, for bidirectional wireless data communication at the premises, an interface for wired communication, and a processor coupled to the transceiver and the interface. The processor provides conversion between data communicated via the wireless local area network transceiver and signals communicated via wired communication interface and control of communications through the transceiver and the interface. The wireless device also includes storage coupled to the processor, and programming executable by the processor contained in the storage. Execution of the programming causes the processor to receive instructions from the gateway device via the transceiver and/or the interface to configure the processor to implement its conversion and communication control functions. The received instructions also configure the processor to communicate with the gateway device via a selected one of the transceiver and the interface and to implement a selected one of a number of wireless-wired adaptations for communications flowing between the selected one of the transceiver and the interface and the other of the transceiver and the interface for communication within the user premises, for an application service delivered by the gateway device.

The received instructions from the gateway device may include instructions to configure the wireless device to conduct wireless communications via the transceiver to provide transport between the transceiver and the gateway device for both private and public communications, route the private communications to or from one of the endpoint interfaces configured as a private network interface, and route the public communications to or from one of the endpoint interfaces configured as a public network interface. One or more endpoint device interfaces of the wireless device may include a first endpoint device interface configured as the private network interface, and a second endpoint device interface configured as the public network interface. In the wireless device, private communications may include communication for in-premises application services. The public communications may include communication with a wide area network.

In yet other examples, the private communications may be transmitted over a private vLAN, and the public communications is transmitted over a public vLAN. The processor and at least one of the transceiver and the interface of the wireless device may be configured to conduct bidirectional wireless data communication with the gateway device for a first application service and a second application service, over a single wireless channel.

The wireless device may further comprise a power interface configured to receive a plurality of voltage levels from a wall power adapter and deliver different voltage levels to one endpoint device interface. The wireless device may further comprise a power interface configured to receive a voltage and deliver a plurality of different voltage levels to the local device interface, the transceiver and/or the processor. The wireless device may further comprise a wall power adapter configured to plug into an electrical power outlet and supply one or more voltages to the power interface. The wall power adapter of the wireless device may also be an uninterruptible power supply. The wireless device may include one or more endpoint device interfaces which include a plurality of endpoint device interfaces, and the device further includes a power interface configured to simultaneously receive a plurality of voltage levels from a wall power adapter and deliver at least two different voltage levels to two different endpoint device interfaces. The power interface may include a power source. The power source may be an uninterruptible power supply.

The wireless device may include two or more endpoint device interfaces, each for wired connection to a communication device. Examples the endpoint device interfaces include: a RJ11 interface, a RJ14 interface, a RJ25 interface, a BS 6312 interface, a 4P4C interface, a RJ45 interface, an 8P8C interface, a mini RCA interface, and a FXS interface.

The detailed description also discloses a communication system for operation within a user premises to provide and manage services of one or more endpoint devices associated with the communication system. The communication system comprises a gateway device controlling communication of one or more associated end point devices over a wide area data network to deliver application services to the associated end point devices including at least some service delivery communication within the user premises. In such a system, the gateway device comprises a first interface for enabling bi-directional network layer communications within the premises, with one or more of the endpoint devices, a second interface for enabling bi-directional network layer communications for the one or more endpoint devices via a wide area network, and a processor coupled to the interfaces. Storage coupled to the processor contains programming in the storage for a number of application services. For each application service, execution of the programming by the processor causes the gateway device to provide server functions in relation to a respective service for one or more endpoint devices. The system also includes a wireless extender. The extender includes a wireless local area network transceiver, for bidirectional wireless data communication with the gateway device and one or more local device interfaces, for wired connection to a communication device The extender also includes a processor coupled to the transceiver and the interface, for conversion between the wireless data communication with the gateway device and signals on the wired connection to the communication device and for control of communications through the transceiver and the interface Storage coupled to the processor contains programming executable by the processor. Execution of the programming causes the processor to receive instructions from the gateway device via the wireless local area network transceiver to configure the processor to implement its conversion and communication control functions in a manner to support a selected one of the application services delivered by the gateway device.

The second interface of the gateway device may further enable at least some bi-directional communications with a service management center external to the premises via the wide area network. In such an implementation, the execution of the programming by the processor causes the gateway device to provide functions in relation to a respective service for one or more endpoint devices, including application server communication with a client functionality of one or more endpoint devices, for the respective service, communicated on top of network layer communications of one or both of the interfaces. The programming also configures the gateway device to provide enforcement regarding authorization, authentication, configuration, or use of the respective service via the one or more endpoint devices. The gateway device may also enable management of the application service based upon the communications with the service management center via the wide area network through the second interface.

The communications by the gateway device with the service management center via the wide area network through the second interface may comprise a signaling channel through the wide area network between the processor and the service management center, and the signaling channel is always on when the gateway device is authenticated with the service management center. Execution of the programming in the gateway device by the processor may further cause the gateway device to support a plurality of different user interfaces via different endpoint devices, with respect to one or more services provided through the gateway device. The programming in the gateway device may comprise service logic modules relating to respective application services. The programming in the gateway device may configure the gateway device to enable peer communications of the gateway device with another gateway device, with respect to at least one of the application services, via the wide area network through the second interface.

The teachings herein also encompass a method of establishing a connection between a transceiver device and a gateway device. The method involves receiving a synchronization instruction from a transceiver device, receiving a synchronization instruction from a gateway device, and configuring the transceiver device and the gateway device for network layer communication over a wireless link therebetween. A wireless session for network layer communication is established between the configured transceiver device and the gateway device. The method also entails configuring the transceiver device and the gateway device to enable an application layer communication between the transceiver device and the gateway device over the established connection, and configuring the transceiver device to interface with a local device to enable the local device to utilize the application layer communication between the transceiver device and the gateway device.

The method may further comprise authenticating the application layer communication between the transceiver device and the gateway device. The method may further comprise authorizing the application layer communication between the transceiver device and the gateway device. The method may further comprise allowing the gateway to automatically configure the transceiver device to support one of a plurality of registered application services. In some of the examples, the application service includes telephony service. The established network layer connection optionally may comprise a secure connection.

The synchronization instructions from the transceiver device or the gateway device may include data used to configure the transceiver device and the gateway device for network layer communication. The synchronization instructions from the transceiver device or the gateway device may include data used to establish a wireless session for network layer communication between the configured transceiver device and gateway device.

In yet another example, a wireless device extends communication of a gateway device within a user premises. In this example, the gateway device controls communication of one or more associated end point devices over a wide area data network to deliver voice services to the associated end point devices. This includes at least some service delivery communication within the user premises. The wireless extender includes one or more local device interfaces, for wired connection to a communication device. A processor, coupled to the transceiver and the interface, controls communications between the transceiver and the interfaces, storage coupled to the processor. Programming contained in the storage is executable by the processor. Execution of the programming causes the processor to receive instructions from the gateway device via the wireless local area network transceiver to configure the processor to implement its conversion and communication control functions in a manner to support a selected one of the application services delivered by the gateway device. The wireless extender may further comprise a wireless local area network transceiver, for bidirectional wireless data communication with the gateway device. The processor may manage at least one of the transceiver and the interface.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 depicts exemplary software and hardware architectures of the multi-services applications gateway and an extender device.

FIGS. 4A and 4B are front and side views respectively depicting an exemplary wireless extender device.

FIGS. 5A-5C depict the managed application services delivery platform and the software and hardware architectures of an exemplary multi-services applications gateway device.

FIGS. 6A-6G depict exemplary extender device deployment diagrams, detailing various uses of the extender device with the gateway device.

DETAILED DESCRIPTION

Figure 1:
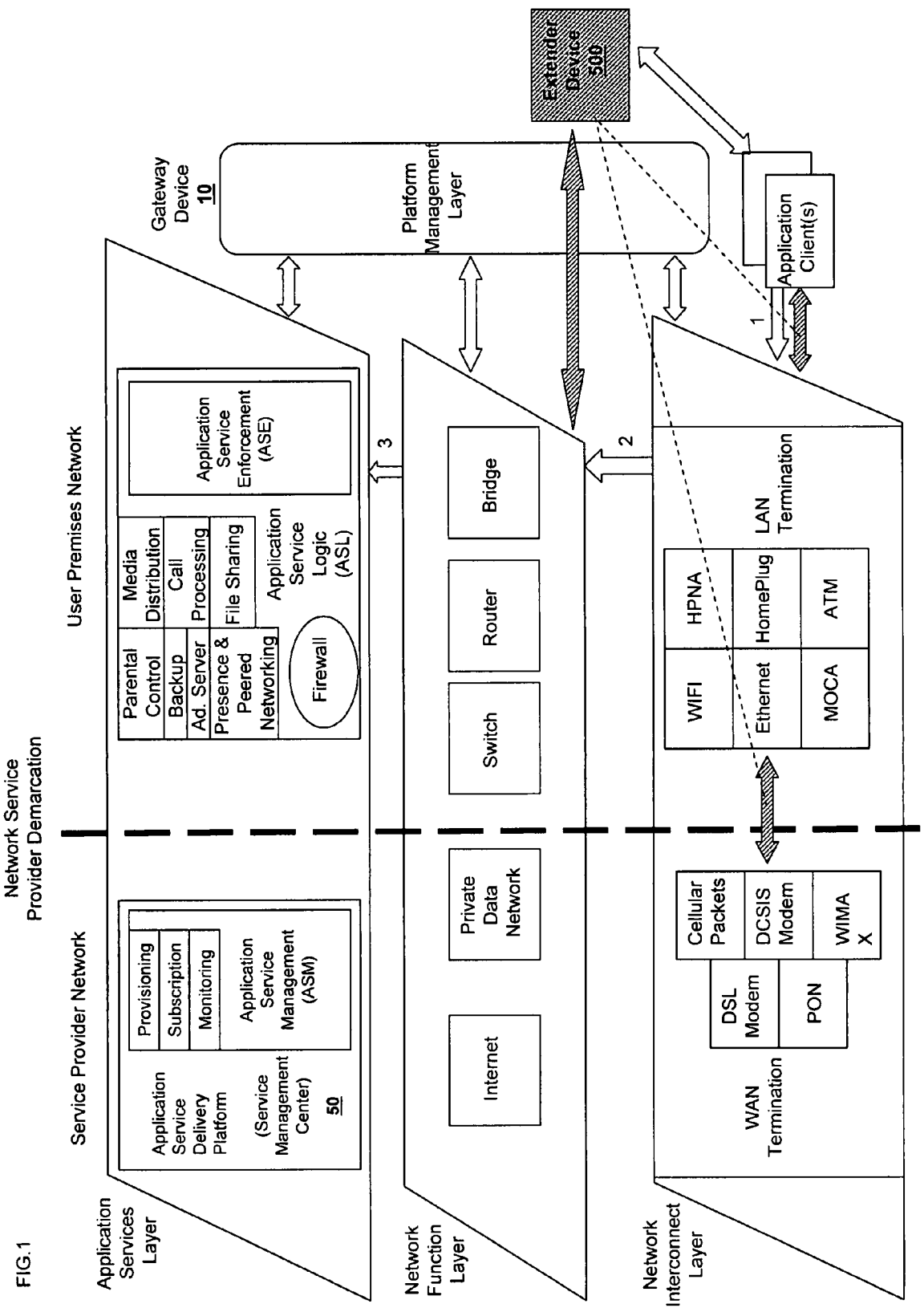
FIG. 1 is a layered logical block diagrams with arrows representing steps of a sample logical flow, for an application client to access a specific managed application service, in a gateway device-service management center type network configuration where a wireless extender may be used to facilitate and/or extend one or more of the links with the gateway device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein move endpoint device interfacing and connectivity, formerly resident in a gateway device, into a external extender device associated with the gateway device, and in some embodiments, move application service logic, formerly resident in a network node, into a gateway device in the customer premises. The extender device is implemented in such a manner as to offer the user many of the network interface and endpoint connectivity as might otherwise be offered in a gateway device, and provides a wireless link to the remote hardware interface out at the extender device. As further described below, these interfaces comprise, by way of example, wired and wireless interfaces including one or more of: telephony interfaces (e.g. RJ11, F-010, etc.), audio/video interfaces (e.g. RCA, S-video, min-RCA, etc.), generic communication interfaces (e.g. USB, RJ45, IEEE 1394, etc.), and legacy computer peripheral device interfaces (e.g. DB9, DB25, IEEE 1284, etc.), wireless communication interfaces (e.g. Bluetooth, WiFi, WiLAN, IR, RF, etc.), and so on. The novel extender devices are programmed to simplify various aspects of managing the emerging home/business digital networks including the myriad of interconnected digital endpoint devices associated with the gateway. The exemplary extender devices are also programmed to allow for interface sharing. The sharing allows a single interface type (e.g. USB) on the extender to serve several endpoint functions including functions traditionally not associated with the particular interface. For example, traditionally, video signals are transmitted across an RCA interface. The extender will allow the use of the RCA interface for other function(s) supported by the endpoint device. If an endpoint device uses an RCA interface for modem communication, the extender/gateway devices together allows for this. These changes in interface functionality are designed to work with the Client-Server architecture described below.

The gateway device and the extender device (hereinafter gateway/extender communication system) are implemented in such a manner as to offer its user many of the applications services, such as were previously offered from network-side servers, from the user premises, with wireless linkage and readily configurable interfacing. As further described below, examples application services comprise programming to simplify support services in the digital home including one or more of: media delivery, content management, access control and use tracking, file sharing, and protection and back-up services of both Internet/Web-generated digital media content and user generated digital media content. The novel gateway/extender devices are programmed to simplify various aspects of managing the emerging home/business digital networks including the myriad of interconnected digital endpoint devices associated with the gateway/extender devices. It is important to note that the endpoint devices need not reside within, or be located at, the premises to maintain their association with the gateway device. In some exemplary configurations, the endpoint devices maintain their association with the gateway device via a bridge(s) with one or more extenders device.

The exemplary extender device moves substantial endpoint connectivity and interface functions previously performed by the gateway devices, out remotely from the gateway over a wireless link, but in a way that allows the gateway device to seamlessly extend its communication reach and to manage endpoint devices remotely via the extender device. In this novel architecture, both the gateway's functionality and the application services offered via the gateway/extender communication system may be managed by the gateway device, which is in turn, partially and/or optionally managed by a service management center located outside the user premises. The multi-location approach described herein decouples and distributes the control and location of the extender devices, gateway devices, and the service management center. The exemplary extender device allows the gateway device(s), located on the user premises, to reach endpoints in the user premises not easily reachable because of the physical location of the gateway device. The extender device further allows the gateway device(s) to reach endpoints beyond the user premises, such as the surrounding area or nearby premises. The cases where applications are at least partially managed by a service management center typically located off-premises, the service management center's control are logically and physically extended by virtue of the extension of the gateway. From a system architecture perspective, the extender is invisible to the service management center. The service management center may know nothing about the extender device but treat the interfaces of the extender as part of the gateway.

The gateway/extender devices and the system architecture effectively place a set of application services on a tightly coupled (e.g. always-on or always-available basis), (optionally) secure hardware platform that is externally managed. The extender devices extend this relationship by physically decoupling the endpoint devices from gateway devices and re-coupling the logical relationship through the extender device. The gateway/extender devices comprise application services programming, and associated hardware, that is positioned on the user premises side of the Network Service Provider Demarcation, which is configured to be managed by an external service management center.

Depending on the embodiments, the gateway device's communications with endpoint devices may or may not include a communication bridge via the extender device(s). In some embodiments, the gateway device may connect directly with the endpoint devices. One exemplary direct connection is illustrated in FIG. 3 where endpoint device would connect into the extender device's various communication points such as RJ45 points 526. Referring to FIG. 1, in embodiments where the gateway-endpoint communications includes one or more extender devices, the endpoint device (e.g. telephone, television, and so on) connects and communicates with an extender device. The extender device, in turn, relays the communication data between the endpoint device and the gateway device via a wireless interface 590 595. In these embodiments, the extender device serves as a bridge connecting the endpoint device and the gateway device. In some embodiments, the extender device bridge may involve multiple intermediary extender devices (e.g. couple in a chain, network, and so on). By decoupling the physical wired connection between the endpoint devices and the gateway device, the reach of the gateway device is extended to that of the extender devices. In some embodiments, the wireless extender may also communicate with the gateway device indirectly, through a second extender device serving as a bridge. In such a scenario, the extender device is further extended by a second extender, further extending the reach of the gateway device.

Some processing and services (for example, those involving communications with endpoint devices) in the gateway device may be offloaded onto an extender device thereby distributing the processing load. In some instances, the processing is described as carried out by the gateway device. Although the present teaching primarily describes processing within the gateway device, it should be apparent to those skilled in the art that the present teachings may be practiced with some of these gateway processing offloaded onto the extender device. In other instances, well known methods, procedures, components, and circuitry have been described at a relatively high-level, without detail, in order to avoid unnecessarily obscuring aspects of the present teachings.

Some processing and services (for example, those involving communications with endpoint devices) in the gateway device may be offloaded onto an extender device thereby distributing the processing load. In some instances, the processing is described as carried out by the gateway device. Although the present teaching primarily describes processing within the gateway device, it should be apparent to those skilled in the art that the present teachings may be practiced with some of these gateway processing offloaded onto the extender device. In other instances, well known methods, procedures, components, and circuitry have been described at a relatively high-level, without detail, in order to avoid unnecessarily obscuring aspects of the present teachings.

Reference now is made in detail to the examples illustrated in the accompanying drawings and discussed below. FIG. 1 is a high-level diagram of the architecture of the gateway/extender-service management center network as disclosed herein, as well as the logical flow of how a specific Application Client or an endpoint device residing at a User Premises could interact with an Application Service in gateway/extender devices that are being managed in the gateway/extender-service management center network configuration. The inclusion of the service management center is optional and will become apparent to those skilled in the art upon examination of the following and the accompanying drawings that this high-level diagram is also applicable to a gateway/extender communication system that does not include a service management center. For example, the functions described as residing in the service management center may be moved into a gateway device. Alternatively, the functions of the gateway device as described in FIG. 1 may be moved across a Network Service Provider Demarcation (described below), and so on.

FIG. 1 depicts one possible configuration for a client application to access a particular service that is being hosted or served outside of the user premises based on the typical, and currently employed, network application service configuration. We identify two regimes in the network services architecture, the Service Provider Network regime (WAN side), and the User Premises Network regime (LAN side). The association between the Service Provider Network and the User Premises Network is broken down into three layers; Network Interconnect Layer (NI), Network Function Layer (NF), and the Application Services Layer (AS). These layers do not represent physical communication pathways, but are a logical representation of pathways and elements employed in a network-based communication. In the context of these two regimes, the extender device interacts with both the Service Provider Network regime and the User Premise Network regime, extends the interface connectivity of both regimes, and interfaces with endpoint devices.

The separation between the managed Service Provider Network (WAN side) and the User Premises Network (LAN side) is depicted as the Service Demarcation Point. The Service Provider Demarcation Point at the Network Interconnect Layer represents the logical and physical separation between the user premises and the broad-band network. In our representation of the three functional layers, we have extended this line into the Services and Application Layer to emphasize the functional barrier at that layer between the Service Provider Network and the User Premises Network, in currently configured networks.

The NI Layer depicts how the connectivity between a User Premises Network and the Public/Service Provider Network is established. On the Service Provider Network side, the Wide Area Network services are terminated onto a WAN termination device with the appropriate interface (e.g. a Broadband internet service such as ADSL would terminate on to a managed ADSL Terminal Adapter). The WAN termination layer adapts the WAN interface into a compatible LAN interface (e.g. Ethernet or WiFi). On the User Premises Network side the LAN Termination interfaces are used to connect to the Local Area Network via a variety of interfaces, such as Ethernet, WiFi, MOCA, etc. The extender device 500 assists the gateway device by providing these LAN Termination interfaces, or in some cases, additional LAN Termination interfaces as, for example, shown by the shaded arrows in the NI Layer. On the User Premises Network side, packets or data must flow through the NF Layer between the WAN Termination Interface and the LAN Termination Interface.

The User Premises NF Layer allows for switching of packets between LAN devices and routing or bridging of packets between the LAN and WAN interfaces. It could physically reside on the same device(s) with the LAN Termination or, in the cases illustrated here, part of the User Premises NF Layer may reside in the wireless extender device that interconnects to the LAN Termination interface via a variety of physical interfaces (e.g. WiFi, Ethernet, MOCA, etc.). The Service Provider NF Layer provides the Wide Area Network access between the WAN Termination device and the AS Layer where all the applications servers are being hosted. The Internet could be used for this connectivity as could a private packet/cell network (e.g. Cellular packet network, or a private ATM or packet backbone). Many network function services that form part of the Network Function Layer, as well as the services that form part of the Network Interconnect Layer, remain with the service provider and the gateway. The extension and interface services reside principally with the gateway/service center as does their logical control. Depicted by the shaded arrows at the NI Layer, the extender device physically extends (the physical connections of FIG. 5A) the interface with the application client and serves as a network extender. Many of these extension and interface functions that were previously offered by gateway devices are now incorporated into and extended by the extender device (i.e., on the hardware components located in the extender devices) as, for example, shown by the shaded arrow between the extender and the NF Layer.

The AS Layer represents the functional layer that provides access to applications services (e.g. authorization, authentication, configuration, provision, monitor, and so on) by application clients. On the User Premises side, the AS Layer provides a Firewall to protect the application client from application level attacks from the open Internet. On the Service Provider side, the AS Layer encompasses application services such as Parental Control, Backup, and Call Processing. These application services exist on a managed Application Service Delivery Platform (ASD) on a secure network server that can be hosted at a facility that has private and or public data connection paths.

Some application services in the User Premises side are implemented as high-level server type logic within a home gateway device at a user premises. Other elements shown in FIG. 1 that may reside in the user premises gateway device (and in some embodiments, also in the user premises extender device) include the user premises-side network function or NF (switch, router or bridge) and the LAN termination for communication with the endpoint devices implementing the application client functions. Thus, with reference to FIG. 1, the first interface, as described above, for enabling bi-directional network layer communications on the user's side of the premises with one or more of the associated endpoint devices resides at the NI Layer and provides the LAN Termination referenced therein. FIG. 1 also depicts the WAN termination providing connectivity to the wide area network (network-side NF—Internet or private wide area data network). The gateway device's second interface, as described above, for enabling bi-directional network layer communications for the associated endpoint devices via a wide area network resides at the NI Layer and provides the WAN Termination referenced therein. The gateway device's second interface also enables bi-directional communications between it and the service management center via the WAN.

With reference to FIG. 1, the core of the logical capacities of the service management center resides on the Service Provider Network (or on the gateway in cases without service management centers), and is depicted as the Application Service Management (ASM) portion of the Application Service Delivery Platform in the AS Layer. The ASM function is implemented in the gateway/service management center, which is external to the extender devices. The service management center and the communications of the center with one or more of the gateway devices provides an infrastructure support and/or management of the application services offered to endpoint devices via the extender devices by the logic implemented in the gateway device(s). Effectively, the Application Service Delivery Platform (ASD), considered in its entirety, extends all the way to the User Premises and traverses the Network and Network Service Provider Demarcation. The secure communications channel would be established through the NF Layer and the NI layer.

Gateway/Extender Devices and Service Management Center Elements—Overview

Figure 2:
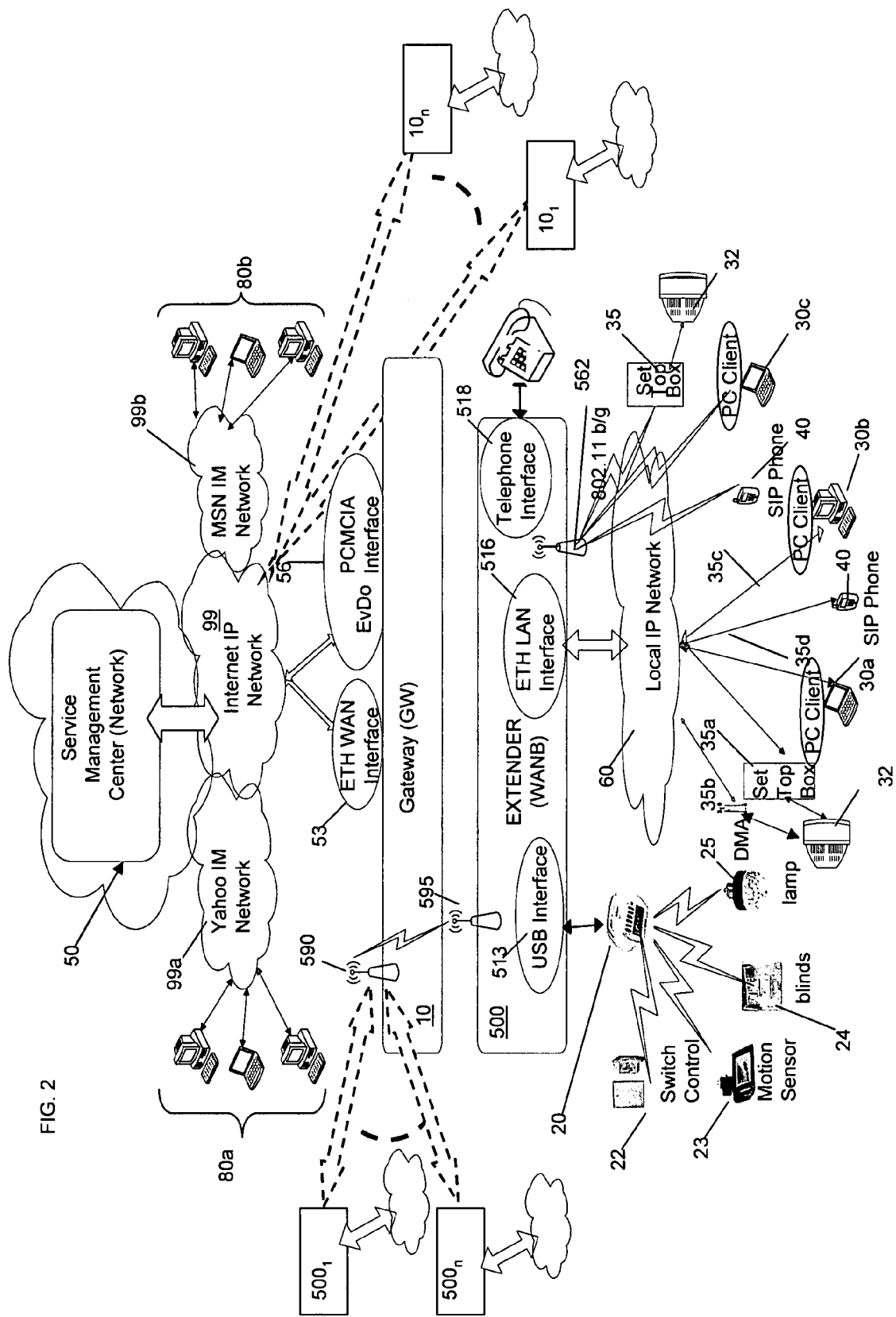
FIG. 2 is a network diagram, depicting a gateway device, a wireless extender, and endpoint devices at a user premises, as well as one or more wide area networks and a service management center.

Those skilled in the art will recognize that functions of the service management center, which reside in the Application Service Management node on the Service Provider Network, as depicted in FIG. 1, may be implemented in a variety of different ways, on one or more computer hardware platforms connected to the gateway devices via a wide area network. FIG. 2 depicts an example of an overall system wherein the gateway devices and service management center implementation are on Internet or other wide area IP network 99.

As shown in FIG. 2, the service management center network, through the logical capabilities earlier depicted in FIG. 1 as the ASM module of the ASD Platform at the AS Layer, manages application services for a number of gateway devices 10, 10$_1$ ... 10$_n$ located at various users' premises. These application services, shown as Application Service Logic (ASL) and Application Service Enforcement (ASE) in FIG. 1, implement their functionality within the Application Services Layer (FIG. 1), through programming that resides, at least in part, within the Application Service Provider Managed Applications and Platform of the UNA-DA (described in greater detail in FIG. 5A). As shown in FIG. 2, secure connectivity to the service management center network 50 is provided, in one embodiment, via a WAN Termination interface, such as Ethernet WAN 53 over a broadband connection via the public Internet 99, or, for example, via a wireless EvDO (Evolution Data Optimized) Internet data interface embodied as a PCMCIA (personal computer memory) wireless card 56. When the WAN Termination interface 53 is used, for example, it may provide connectivity to a broadband modem serving as the NSP-TA of FIG. 5A, either as a separate unit or on a board included within the gateway device 10. If the wireless WAN interface is used, there may be no physical NSP-TA device, and the logic of the gateway device would implement functions of the NSP-TA as well.

As will be described in greater detail herein below, the service management center 50 generally provides a communications and processing infrastructure for supporting the variety of application services and related communications residing at the gateway devices 10, 10$_1$ ... 10$_n$. In an exemplary embodiment, this infrastructure may be configured to provide a secure environment and may be IP-based. Preferably, this support architecture is designed for high availability, redundancy, and cost-effective scaling. At the user's premises, the system includes one or more extender devices 500$_1$ ... 500$_n$ that facilitate communications in support of application services provided by or through the gateway devices.

The platform for building and providing multiple application services for digital endpoints associated with a gateway device requires connectivity between the gateway device 10 and each of a user's devices (referred interchangeably herein as "endpoint devices" or "digital endpoint devices"). This connectivity is provided by the extender device 500 serving as a communication bridge between the gateway device 10 and the endpoints. The connectivity between the extender device 500 and the endpoints may be provided by implementation of one or more USB ports (interfaces) 513, a wired Local Area Network connection such as provided by an Ethernet local area network (LAN) interface 516, a wired telephone connection such as provided by a telephone front end RJ11 interface 518, or, a wireless network interface via a WiFi LAN access point 562 provided, for example, in accordance with the I.E.E.E. 802.11 b/g/n wireless or wireless network communications standard, these interfaces 513 516 518 562 residing in the extender device 500. These physical interfaces (513, 516, 518 and 562) provide the required network interconnectivity for the endpoint devices to connect to the multiple application services.

The extender device 500, in turn, bridges these communicates with the gateway device 10 using a wireless interface 595 located on the extender device 500 and a wireless interface located on the gateway device 590. The extender device 500 provides a transparent bridge wherein from a user software interface perspective, connecting endpoint devices to the extender device 500 is functionally equivalent to connecting endpoint devices to the gateway device 10. However, from a user physical interface perspective, connecting endpoint devices to the extender device 500 is more convenient than connecting endpoint devices directly to the gateway device 10 because the extender device 500 may be placed near the endpoint devices enabling user freedom in choosing the desired location for the endpoint devices. These enumerated interfaces 513, 516 and 562 are exemplary and it will become apparent to those skilled in the art upon examination of the following and the accompanying drawings that other interfaces may be used to serve as communication interfaces with various endpoint devices. Further, multiple extender devices 500 may be placed in various locations of the user premises. Although not shown in FIG. 2, this connectivity between digital endpoint devices, the extender device, and the gateway device may be accomplished by other means, including, by way of example, through of a virtual private area network connection accessed through a WAN interface.

Via one or more of its interfaces, the extender device 500 supports gateway communications with one or more digital endpoint devices in the premises including, but not limited to: a home automation networking device 20 (e.g. X10, Z-Wave or ZigBee) for wired or wireless home network automation and control of networked home devices such as a switch controller 22, sensor devices 23, automatically controlled window blinds 24, a controlled lighting or lamp unit 25 etc, individual or wired or wireless network of personal computing (PC) and laptop/mobile devices 30a, ..., 30c that serve as file sources, control points and hosts for various other client endpoints, one or more television display devices 32 including associated set top boxes (STB) 35a or digital media adapters (DMA) 35b, one or more VoIP phone devices (e.g. SIP phones) 40, or other devices (not shown) that convert IP interfaces to PSTN FXO and FXS interfaces.

As noted earlier, the extender device 500 may provide an interface 35b to the Digital Media Adapter (DMA) for television (TV) 32, which enables bidirectional wireline or wireless communication. This interface supports several functions for multiple services including, but not limited to: media (e.g., video and music) by enabling the transfer of media (e.g., video and music) to the TV; voice services, by providing for Called Line ID and for voice mail control; and provide Home Automation Services including status and control of networked home automation devices. The DMA element 35b converts audio and video (optionally) to a format suitable for a TV. In addition, the Digital Media Adapter 35b may be capable of receiving context-sensitive commands from a remote control device (not shown) and forwarding those commands to the gateway device 10 via the extender device 500. This enables the use of menus on the TV 32 for controlling application services and various features functions thereof, as offered by the gateway device 10. For example, the Media Adapter/TV combination is able to provide the following features including, but not limited to: display of media; media control functions, when enabled (FF, REW, STOP, PAUSE, etc); display of Calling Line Identification (CLID); control of voicemail; picture viewing; control of home automation; and user functions for the gateway device 10 and the extender device 500.

A Set Top Box 35a as shown in FIG. 2 also may handle media format conversion (for example NTSC to ATSC television RF signals), digital decryption and other DRM (digital rights management) functions, and Video On Demand Purchases, etc. The Set Top Box/TV combination may thus enable, by way of example: Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA interface 35b and the TV 32 or by the set-top-box 35a and the TV 32, the communications to and from the TV provide a user interface for interaction with the gateway device 10 (by way of the extender device 500). The programming of the gateway device supports, among other things, a graphical user interface (GUI) via the TV, sometimes referred to as the "ten-foot" interface.

With respect to PCs interfacing with the gateway device 10 by way of the extender device 500, PCs may serve as, among other things, file sources, control points and hosts for various software clients. Thus, the PC programming may work in conjunction with the ASL and ASE programming of the gateway device. Together, the PC programming and the ASL and ASE programming provide a more comprehensive and robust user experience. The gateway device 10 may further provide a bidirectional wireline or wireless interface 35c to a PC device 306 for supporting the transfer of media (e.g., video and music) to the computer for storage and viewing; for supporting voice services, e.g., by providing for calls from SIP soft clients; for file sharing, file back-up and home storage and home automation control functions. The access point 62 offers wireless data communications with a PC 30c. The gateway device interface through any PC may provide for the bidirectional moving of files, and status and control for the endpoint devices, including for example, status and control of networked home automation devices. In addition, using the PC interface, users may, for example, share files on the gateway devices, back-up or transfer files to the gateway devices or other storage; access personal page for notifications, RSS, shared photos, voicemail, etc. In addition to the IM and SIP capabilities of the gateway device, as described more below, PCs may also serve as a host for IM and SIP soft phone clients and other client devices. The client-server interaction of the PC with the application service logic of the gateway device 10 offers an alternative GUI for at least some of the services. The PC based GUI is sometimes referred to as the "two-foot" interface.

Although not shown in FIG. 2, other digital endpoint devices for which connectivity may be established with the gateway device 10 include, but are not limited to: personal music or media players, hi-fi audio equipment with media streaming capability, game stations, Internet radio devices, WiFi phones, WiFi or other wirelessly enabled digital cameras, facsimile machines, electronic picture frames, health monitors (sensor and monitoring devices), etc.

As described in greater detail herein, the gateway device 10 includes both a hardware and software infrastructure that enables a bridging of the WAN and LAN networks, e.g. a proxy function, such that control of any digital endpoint device at the premises from the same or remote location is possible via the gateway device 10 using, optionally, a secure peer and presence type messaging infrastructure or other communications protocols, e.g. HTTPS. For example, via any IM—capable device or client 80a, 80b respectively connected with an Instant Messaging (IM) or XMPP (Extensible Messaging and Presence Protocol) network messaging infrastructure, e.g. IM networks 99a, 99b such as provided by Yahoo, Microsoft (MSN), Skype, America Online, ICQ, and the like, shown for purposes of illustration in FIG. 2, a user may access any type of functionality at a subordinate digital endpoint device at the premises via the gateway device 10 and service management center 50 by simple use of peer and presence messaging protocols. In one exemplary embodiment, a presence messaging protocol may be used such as XMPP. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint device or application at the premises via the IM-based messaging framework. In addition, the gateway device 10 and network connectivity to the novel service management center 50, provides, in a preferred embodiment, a secure presence and networking messaging framework, enabling real-time communications among peers via other gateway devices $10_1 \ldots 10_n$. For instance, the device 10 provides the ability to construct communication paths between peers with formal communications exchanges available between, for example, one gateway device $10_1$ at a first premises and a second gateway device $10n$ located at the remote premises. Thus, such an infrastructure provides for content addressing, enabling peers through remote gateway devices $10_1 \ldots 10_n$ to supply and request content such as files, media content or other resources of interest to a community of interest.

Figure 5A:
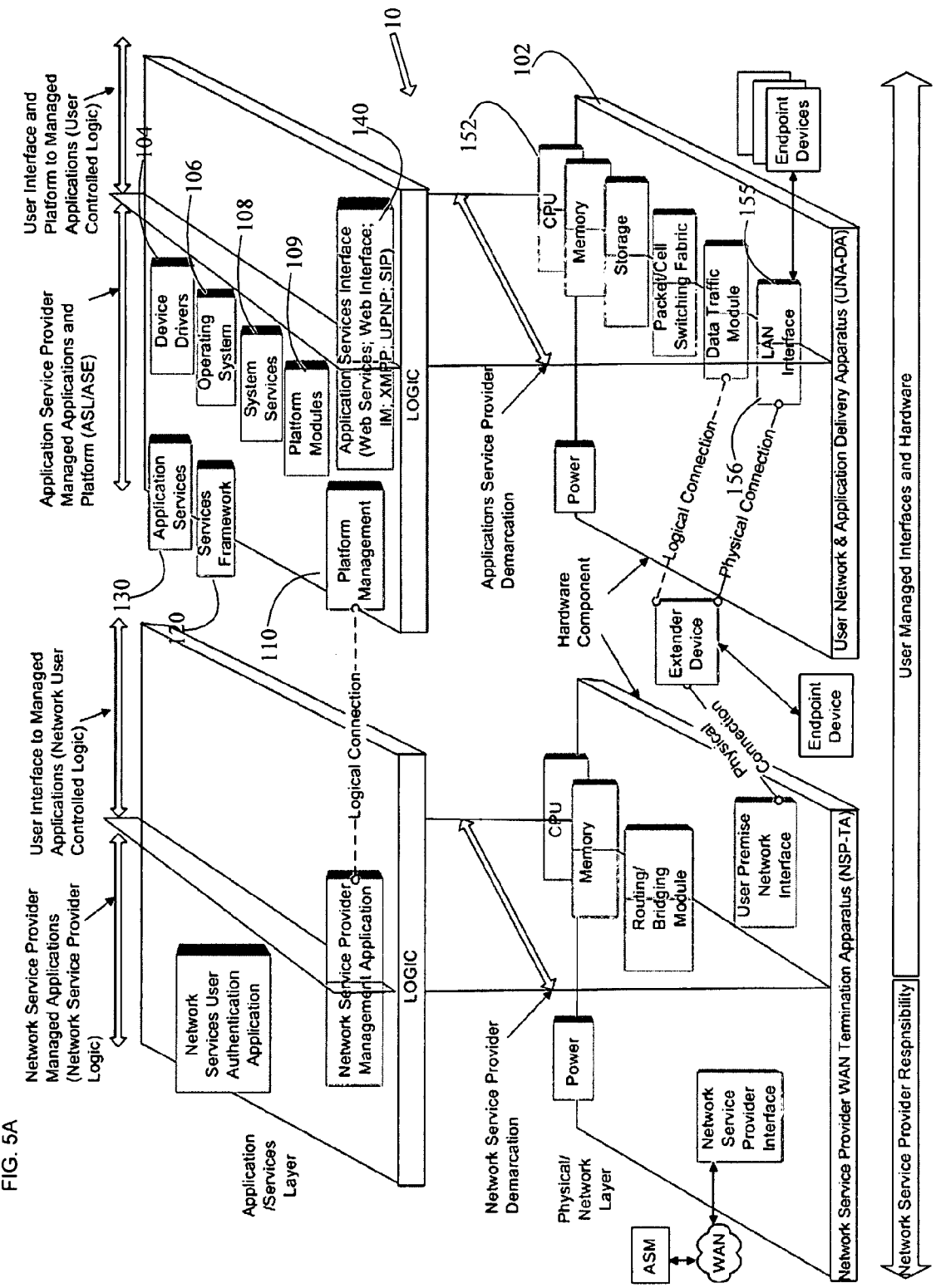

As noted above, the system architecture allocates the logical functionality of the ASD Platform (FIG. 1) between the gateway device 10 and, in embodiments having a service management center 50, the service management center 50 within an environment that enables communication and feedback at the AS Layer (FIG. 1) between the gateway device 10 and service management center 50. Thus, the gateway/service management center system (or standalone gateway device) makes possible the management of services for the digital home and facilitates the easy addition of new services or modification of existing services. Such services may include, for example, facility management (home automation), media content downloading and Digital Rights Management (DRM), device updates, data backups, file sharing, media downloading and transmission, etc., without the intermediary of a plurality of external service providers who may typically provide these individual services for every digital endpoint device in the home or premises. The programming for these services resides in the Application Service Provider Managed Applications and Platform of the UNA-DA (FIG. 5A). That is, as earlier shown, the gateway device 10 is integrated with hardware and software modules and respective interfaces that handle all aspects of home automation and digital endpoint service and management for the home in a manner without having to rely on external service providers and, in a manner that is essentially seamless to the user. This, advantageously is provided by the service management center 50 which is able to access regions of the gateway device 10 that are not accessible to the user, e.g. for controlling the transport and storing of digital content and downloading and enabling service applications and upgrades and providing largely invisible support for many tasks performed by users.

For example, with the robust capabilities of the Application Service Provider Managed Applications and Platform (FIG. 5A), the gateway device 10 is capable of handling all aspects of the digital home communications, e.g. IP, voice, VoIP, phone connectivity. In this example, the service logic located and stored at the gateway device 10 may provide soft-switch functionality for implementing call-processing features at the premises (rather than the network) for voice communications, and enabling management of other service features to be described. With the provision of central office type call services and other service features provided at the gateway devices $10_1 \ldots 10_n$, a distributed soft-switch architecture is built. The ASM logical functionality of the service management center 50, in cooperation with the ASE logical functionality of the gateway device, may, among other things, provide, manage and regulate, for example, service subscription/registration, authentication/verification, key management, and billing aspects of service provision, etc. With all of the service logic and intelligence residing at the gateway device, a service provider can offer customers a broad spectrum of services including, but not limited to: media services, voice services, e.g. VoIP, automated file backup services, file sharing, digital photo management and sharing, gaming, parental controls, home networking, and other features and functions within the home or premises (e.g. home monitoring and control). Users can access their content and many of the solution's features remotely. Moreover, software updates for the in-home devices that require updating are handled in an automated fashion by the system infrastructure. The service management center infrastructure additionally provides a web interface for third-party service providers to round out the service solutions provided at the gateway device for the premises. For example, a third-party service provider other than the managed service provider associated with the service management center may be allowed access through the infrastructure to particular endpoint devices to provide additional services such trouble shooting, repair and update services.

Although the previous illustrative example describes the extender device in the setting of a gateway/service management center system, the extender device does not require a service management center or a gateway device. For example, in some scenarios, the extender device extends a gateway device that does not interact with a service management center (i.e. a standalone home device management system). In other scenarios, portions (or the entirety) of the various functionalities and services provided by the gateway device(s) and the service management center may move across the network service provider demarcation, and so on.

Gateway/Extender Devices Software and Hardware Architecture

The composition of the premises gateway device 10, earlier described with reference to FIG. 2, is now described in greater detail with reference to FIGS. 3, 4A and 4B.

FIG. 3 provides a functional block diagram of exemplary elements of the hardware layer 102. In communication with the gateway device 10 (further described below), the extender device 500 bridges communications between endpoint devices and the gateway device 10. Endpoint devices connect to the extender device 500 and communicate with the gateway device 10 via the extender device 500. Depending on the application and/or service, the gateway device 10 also administers commands to, configures, or transfers instructions to the endpoint device via the extender device 500.

An extender device 500 provides a voice/network module 510 for communications and connections with endpoint devices, and a power module 540 for supplying power to the voice/network module 510. The voice network modules include the wireless local area network transceiver one or more interfaces for wired communication, and a processor (e.g. central processing unit or 'CPU') coupled to the transceiver and the interface. Hence, in the example, voice/network module 510 provides a CPU 520 and associated system components. The wireless device also includes storage coupled to the processor, and programming executable by the processor contained in the storage. Hence, in the example, the CPU 520 is coupled to a memory module 522 for storing both persistent data and temporary data such as random access memory ("RAM") or flash.

An Ethernet module 524 and associated LAN port(s) provide an Ethernet LAN interface 526. The wireless WAN module 530 and associated WAN antenna(e) 595 provide an uplink communication interface with the antenna 590 of the gateway device 10. The wireless WAN module 530 and associated WAN antenna(e) 562 may also serve as a wireless bridge, repeater, router, switch, hub, and so on for endpoint wireless devices. Subsequently, the Wireless Data module (WiFi in this case) 530 can provide network connectivity via a wireless interface 562, and the Ethernet Module 524 can provide network connectivity via a wired interface 526. For example, an endpoint stereo system may connect to an endpoint computer system for music or two endpoint computer systems may transfer files using the extender device(s) as a network hub. The CPU 520 is further coupled to a telephone front end module 534 which can terminate analog telephone interfaces (any combination of FXS and FXO interfaces); here, the FXS connectivity is provided via RJ11 interfaces 536. The CPU may also have embedded DSP functionality. The voice/network module 510 includes a power interface to receive DC power input from a power module 540.

The power module 540 provides an AC input 542 for receiving power from a power source (such as a wall outlet) and a DC output 546 for supply power to the voice/network module 510. Power received form the AC input 542 is distributed to an AC/DC power adapter 544 that converts the AC power into DC power. The AC input 542 is also connected to a solid state power relay 548, the power relay 548 controlling the power output of an AC output 550 (e.g. changing the frequency of AC output, switching the AC output on/off, and so on). In some embodiments, the power relay 548 receives control instructions 552 from the voice/network module 510 (e.g. Zigbee access devices, WiFi access devices, and so on) enabling the voice/network module to switch the AC output socket on and off, control the output power level, change the output voltage/frequency, send signals (e.g. power line communication, power line telecom, power line networking, and so on), serve as a fuse, and so on.

Described differently, one of the primary functions of the power module 540 is to convert an AC input 542 into a DC output 546, and therefore the DC input 538 to the voice/network module 510. In addition, the power module 540 has an additional AC output port 550 which is also powered by the AC input 542. This AC output 550 can be directly connected to the AC input 542 (as depicted by the dashed line) forming a pass through. Optionally, it can be connected to a Solid State Power Relay 548 which can in turn be connected via a control signal lead 552 from the main CPU 520, which in turn allows the CPU 520 to control the state (on or off) of the AC output port 550. This technique and device provides a means to power the wireless adapter and network bridging apparatus (WANB) 500 without loosing an AC outlet in the home since the secondary AC outlet 550 is provided.

The AC adapter may be configured and tailored for use with various power standards or electrical systems. Since the frequency of the electrical system, the voltage, and the outlet configurations varies by country, different input power interfaces 542 may be adopted for use with the power module 540. To illustrate with an example, the United States uses a UL-NEMA 5-15 USA 3 pin plug. For a power module configured for use in the USA, the AC input 542 may be configured for used to plug into a UL-NEMA 5-15 USA 3 pin socket. The AC/DC power adapter 544 would also be configured to convert a 120 V, 60 Hz AC current into the DC voltage usable by the voice/network module, for example, 12V. On the other hand, CEE 7/17 Euro 2 pin are commonly found in Germany. In a power adapter 540 configured for use in Germany, the AC input would be configured to plug into the Euro 2 pin and the AC/Dc power adapter 544 would be configured to convert 230V/50 Hz AC into the desired DC voltage. In some embodiments, the power module 540 has automatic voltage/frequency adapting circuitry within the AC/DC power adapter and can adjust for various input frequencies and voltages. Together, the voice/network module 510 and the power module 540 form the extender device 500, also know as a multi-interface wireless adapter and network bridging apparatus (WANB).

The voltage for the DC input/output may be standardized (e.g. 5 V, 12 V, and so on) across devices to allow for easy manufacturing, use, and deployment of the WANB 500 across various electrical standards. This allows the voice/network module 510 to have a fixed design for multiple geographic regions and the power module 540 would be modified for additional compliancy and safety testing for each country. For example, a traveler who frequents between two countries or a manufacturer developing the WANB 500 for two countries with different electrical standard would need to develop only one standardized voice/network module. The standardized voice/network module may then be packaged with various power modules tailored to the countries' specific electrical standards. In some embodiments, the DC input/output may be standardized to deliver multiple voltage levels, which would be useful in power telephonic devices because the ring and the voice use different voltages.

In the gateway device 10, a USB controller in the system on a chip and one or more associated USB ports provide the USB interface 158. The USB interface 158 may provide an alternate in-premises data communication link instead of or in addition to the wired or wireless Ethernet LAN communications. The system on a chip includes a security engine, which performs the functions of the data encryption/decryption unit 162.

The hardware layer 102 may also include an option module on the gateway device 10. The UNA-DA hardware components at layer 102 have multiple interfaces for connection to such an option module. These interfaces, by way of example, could be a data bus (e.g. PCI, etc), network interface (e.g. Ethernet (RJ45), MoCA/HPNA (Coax)) and Power feeds. The option module allows additional functionality to be added to the base UNA-DA functionality of the gateway device. For example, this additional functionality could be everything from support for a variety of extra Wide Area Network Interfaces (e.g. xDSL, DOCSIS, Fiber (PON), Cellular Packet, WIMAX, etc.), Media Processing (e.g. Cable TV termination, Digital Video Recording, Satellite TV Termination, etc), to Voice Processing (FXS, FXO, Speech Detection, Voice to Text, etc). The option module may have its own standalone CPU, Memory, I/O, Storage, or provide additional functionality by its use of the CPU, Memory, I/O, and storage facilities off of the main hardware board. The option module may or may not be managed directly by the Platform Management of the UNA-DA.

The gateway system 10 on a chip provides the CPU 152 and associated system components. The CPU 152 is also coupled to a random access memory ("RAM") and flash memory. The system on a chip also includes a hard drive controller for controlling a hard disk drive, and together the controller and drive form the hard disk example of the storage 154. An Ethernet switch and associated LAN port(s) provide the Ethernet LAN interface 155 (interfacing with endpoint devices via a physical connection with the extender device); and the Ethernet switch and associated WAN port provide a landline implementation of the WAN interface 156L, for connection to a broadband modem or the like implementing the NSP-TA. The extender device, connecting the LAN interface (and to the User Premise Network Interface) to endpoint devices via a physical interface, is connected to the data traffic module via a logical connection. The WAN interface may also be wireless, as implemented at 156 w for example by a wireless WAN module and associated antenna. An example of such an interface would be the EvDO interface discussed earlier. If the gateway device uses the wireless WAN interface 156w, there would be no separate NSP-TA.

Although the voice/network module 510 and the extender device 500 illustrated here displays interfaces for RJ45 and RJ11 connections, it should be apparent to those skilled in the art that the present teachings may be practiced with other interfaces including interfaces with wireless FXS devices, home security monitor systems interfaces, PSTN, MAC, DB9, DB25, DVI, RCA, mini-RCA, S-video, Bluetooth, HPNA, MoCA, FM transmitter, and so on.

In the case of security monitoring or other power critical services, if one of the endpoint devices relates to a service where high availability is important, such as a FXS security system adaptor, the extender device 500 may include a battery back up for the power supply to ensure high availability of the system. In these scenarios, the gateway system which supports the FXS Security System Adaptor should also be battery backed-up or connected to an uninterruptible power supply (UPS). In some embodiments, the power adapter may be an "In-line UPS power adaptor" to provide high availability.

FIGS. 4A and 4B show external views (front and side views) as would typically be seen by a user of the extender module described in FIG. 3. From the user's perspective, the user sees two modules, the voice/network module 510 and the power adapter module 540. On the power adapter module 540, the user sees two power interfaces, the DC output adapter 546 and the AC output 550, illustrated here both as sockets, and a power input interface 542 (here, prongs) for plugging the power module 540 into a power source such as a wall socket.

On the voice/network module 510, the user sees a power interface 538 for interfacing with the power module 540. For interfacing with endpoint devices, the user will find interfaces such as a RJ45 526 and a RJ11 536. Two interfaces not illustrated in FIG. 4E are one or more light emitting diodes (LED) 532 for communicating with the user the status of the extender and a setup interface 512. Various LED communication techniques (e.g. flashing, color, and so on) are well understood in the art. The setup interface 512 is used to establish a WiFi protected setup (WPS) with the gateway device. Although illustrated here as a switch for use with the PBC method of WPS, it can be any interface/device used to establish a connection with the gateway device 10.

FIG. 5A depicts, at the Physical/Network layer shown therein, an example of user premises hardware components required for delivering data services (i.e. Internet connectivity) along with a separate, non-integrated managed hardware used in delivering a set of managed application services (i.e. IP telephony). The Network Service Provider Wide Area Network Termination Apparatus (NSP-TA) allows for a typical termination of Wide Area Network Services, such as DSL, Cable, Fiber, etc, by a network services provider. The NSP-TA provides the WAN Termination in the NI Layer (FIG. 1). The NSP-TA may be an existing user-premises device(s), provided by the carrier supplying network services to the premises and extended by an extender device. FIG. 5A also depicts the Network Service Provider Demarcation at the hardware level.

If configured as a standalone device, the NSP-TA device is required to have its own CPU, Memory, physical interfaces and logic control. The physical interfaces to the endpoint devices may be augmented and extended by the extender device thorough a physical connection between the standalone device and the extender device. In order for Network Service Providers to deliver managed services, they typically require a management element controlled by the CPU on the NSP-TA. To depict these logical elements residing on the hardware components, FIG. 5A includes an Application/Services Layer above the hardware layer. This layer corresponds to the AS Layer of FIG. 1, but without reference to any logical elements residing at the network services provider. The management element, represented by the Network Service Provider Managed Application, allows the network service provider to determine the status of the network hardware device and interfaces as well as maintain a certain degree of security enforcement at the customer premises. As noted, the network service functionality is at the NI and NF Layers and generally does not extend to the AS Layer(s) beyond basic authentication authorization and state management. As with the hardware components, the logical elements also have a Network Service Provider Demarcation as shown in FIG. 5A. On the WAN side, depicted as the Network Service Provider Managed Applications side, of the Network Service Provider Demarcation, resides the applications that are managed, and under the exclusive control, of the network service provider (the Network Service Provider Logic). The User Interface to Managed Applications is present on the LAN side of the Network Service Provider Demarcation within the Application/Services Layer. Within this interface resides programming and logic available to users other than the network service provider referred to as the Network User Controlled Logic. The Network User Controlled Logic, which is depicted at the Application/Services Layer in FIG. 5A, provides a user interface to the Network Service Provider Logic and, to the extent permitted by the Network Service Provider Logic, interaction with or communication between the user and network service provider through the Network User Controlled Logic and the Network Service Provider Logic, and to the NSP-TA hardware components. The Network User Controlled Logic allows for the User of the hardware to make certain, minimal programming changes relevant to their preferences (e.g., user name and password changes, local IP addresses changes, local interface selection). All user devices typically can only communicate with the NSP-TA through one or more of the User Premises Network Interfaces. The user can modify the Network User Controlled Logic through the User Premises Network Interface. The Network Service Provider Demarcation is typically within the NSP-TA, logically dividing the Network Service Provider Interface and the User Premises Network Interface modules. The network service provider does not have any in depth visibility or significant responsibility beyond the Network Service Provider Demarcation.

The User Network and Application Delivery Apparatus (UNA-DA), shown on the right hand side of FIG. 5A, is a separate managed gateway device that a managed service provider (which may be different than the network service provider) would control in delivering a set of application services to the user premises. This device has its own dedicated CPU, memory, logic control, as well as its own dedicated set of interfaces (which may be augmented and/or extended by the extender device as described herein). The UNA-DA includes one or more Network Interfaces providing connectivity to the NSP-TA as well as to user premises endpoint devices. The Network Interface(s) of the UNA-DA connects to the extender device(s) via a physical connection (i.e. WiFi transceiver, WiLAN transceiver, RJ45 wire, and so on) with the LAN Interface and a logical connection (i.e. a virtual private LAN, and so on) with the Data Traffic Module. The extender, in turn, may connect to the endpoint devices via a wired or wireless connection as described herein. The NSP-TA may also establish a physical connection (i.e. WiFi transceiver, WiLAN transceiver, RJ45 wire, and so on) with the extender devices. In turn, the extender device(s) provide an extended/augmented connection to the endpoint devices. The interfaces provide the LAN Termination functionality at the NI Layer (FIG. 1). One skilled in the art will readily recognize, however, that the physical connection that connects the UNA-DA to the NSP-TA also provides connectivity for the UNA-DA to the public (WAN side) network, and is the means by which the UNA-DA accesses the public network. The end point devices connected to the LAN Interface via the extender device(s) are on the private (LAN) side of that interface. The UNA-DA also includes a switch, router or bridge for the NF Layer.

Programming elements of the UNA-DA are depicted at the Application/Services Layer of the UNA-DA. Certain logical elements, depicted as the Application Service Provider Managed Applications and Platform in FIG. 5A, on which resides, inter alia, the programming corresponding to the ASL and ASE of FIG. 1, are managed by the managed application service provider's network control center, e.g. by the ASM through a wide area network (WAN) by means of a control channel to the Application Service Provider Managed Applications and Platform. The Application Service Provider Managed Applications and Platform includes a platform management logic module that, with other programming in the Platform and the ASM, allows the managed application service provider to control the hardware elements of the UNA-DA in addition to any other relevant application services logic or hardware that may reside on the user premises. For example, this programming enables managed application service provider to control and manage the hardware elements on the UNA-DA to ensure proper use and allocation of the UNA-DA's processing, memory, storage, and bandwidth, to monitor local hardware security and generate needed alarms or protection sequences, and to prioritize applications based on a set of established policies. The user would have control over specific parameters of the UNA-DA through the User Interface and Platform to Managed Applications (User Controlled Logic) shown in FIG. 5A. These parameters allow the user to control the local behavior of the interfaces and to configure the specific applications to accommodate the user network as configured by the user and to implement the user preferences for those applications.

To identify the separation of, and distinguish between, the programming and hardware components subject to control by the managed service provider and those subject to control by the user premises, FIG. 5A identifies a dividing line across the logical elements of the UNA-DA, and a corresponding dividing line across hardware components, referred to as the Applications Service Provider Demarcation. The Applications Service Provider Demarcation is flexible in that it may extend logically through the Application Services Interface (and, in a hardware context, through the Network Interface) to other devices that are under the logical control of the Application Services Provider Managed Applications and Platform, given that "services" are not restricted to a specific hardware boundary.

There is no hard requirement for cross management between the UNDA-DA and the NSP-TA. Under this first scenario the user is responsible for making the configuration changes in the specific user controlled logic modules in order to get the two devices to communicate with each other. Optionally the two sub-systems can be combined together, either physically in one hardware device, or logically as two separate hardware devices, but having one user managed interface.

The two hardware regimes described above (NSP-TA and the UNA-DA) may be combined into one managed hardware platform and, thereby, replace the need for the user to have access to the User Premises Network Interface with the logic residing in the Platform Management logic module of the Application Service Provider Managed Applications and Platform (compare to above-discussed FIG. 12). This would in effect replace the "user" access with a managed "machine" access, for aspects of the NSP-TA, as well as aspects of the application services offered through the UNA-DA. Thus, the combination creates an integral gateway device providing both network service and application services, under centralized management. Although integrated, network interconnect functions of the NSP-TA may still be managed by the network service provider, as in the example of FIG. 5A. Those skilled in the art will readily see additional combinations and configurations for the hardware comprising the NSP-TA and the UNA-DA. For example, in a further embodiment, all the hardware dedicated to the Network Service Provider Interface may reside and be integral with the hardware comprising the UNA-DA. Thus, the hardware for the WAN interface may reside on the UNA-DA.

Figure 5B:
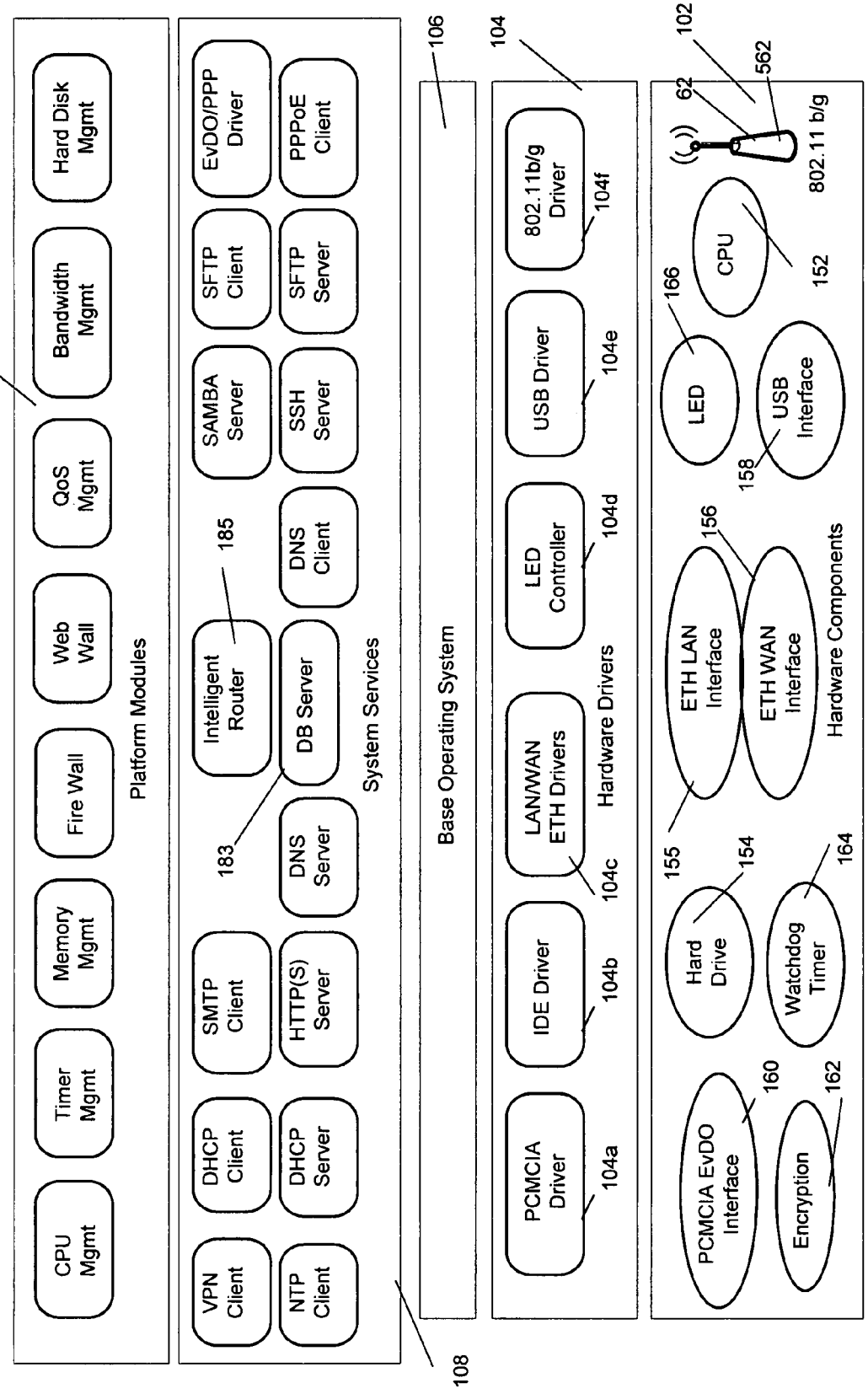

As shown in FIG. 5B, the device driver layer 104 comprises a multitude of driver interfaces including but not limited to: a PCMCIA driver 104a, for enabling low level communication between the gateway CPU 152 and the PCMCIA network interface card wireless interface, an IDE driver 104b for enabling low level communication between the gateway CPU 152 and the local mass memory storage element, and LAN/WAN drivers 104c for enabling low level communication between the gateway CPU 152 and the respective network interface cards 155 and 156. The exemplary driver layer also includes an LED driver/controller 104d for driving LED(s) 166, a USB driver 104e allowing CPU 152 to communicate via USB interface 158, and an 802.11b/g (or n) wireless network driver 104f for allowing the CPU 152 to communicate via the access point 62 (or 562). The drivers provide the logical connectivity between the low level hardware devices 102 and the operating system 106 which controls the execution of computer programs and provides scheduling, input-output control, file and data management, memory management, and communication control and related services for the gateway device. With respect to the operating system 106, the gateway computing may support any embedded operating system, any real-time operating system, any open source operating system, any proprietary operating system, or even any operating systems for mobile computing devices as long as the operational needs of the client discussed herein below can be met. Exemplary operating systems that may be employed include Windows®, Macintosh®, Linux or UNIX or even an embedded Linux operating system. For instance, the gateway device 10 may be advantageously provided with an embedded operating system 106 that provides operating system functions such as multiple threads, first-in first-out or round robin scheduling, semaphores, mutexes, condition variables, message queues, etc.

Built upon the system operating system 106 is a system services support layer 108 providing both client-like and server-like functions that enables a wide range of functionality for the types of services capable of being managed by the gateway device 10. For instance, there is provided a Dynamic Host Configuration Protocol (DHCP) client and server software modules. The DHCP client particularly requests via a UDP/IP (User Datagram Protocol/Internet Protocol (e.g. Ipv4, Ipv6, etc.) configured connection information such as the IP address that the gateway device 10 has been dynamically assigned by a DHCP service (not shown), and/or any the subnet mask information, the gateway device should be using. The DHCP server dynamically assigns or allocates network IP addresses to subordinate client endpoints on a leased, e.g. timed basis. A Virtual Private Network (VPN) client may communicate via a proxy server in the service control network 50, according to a VPN protocol or some other tunneling or encapsulation protocol. An SMPT client handles incoming/outgoing email over TCP, in accordance with the Simple Mail Transfer protocol. A Network Time Protocol (NTP) (RFC 1305) generates and correlates timestamps for network events and generally provides time synchronization and distribution for the Internet. A Domain Name Server (DNS) client and server combination are used by the IP stack to resolve fully-qualified host or symbolic names, i.e. mapping host names to IP addresses.

An HTTP(S) server handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client and server combination governs the ability for file transfer over TCP. A SAMBA server is an open source program providing Common Internet Files Services (CIFS) including, but not limited to file and print services, authentication and authorization, name resolution, and service announcement (browsing). An EvDO/PPP driver includes a Point-to-Point Protocol (PPP) daemon configuration for wireless broadband services. A PPPoE (Point-to-Point Protocol over Ethernet) client combines the Point-to-Point Protocol (PPP), commonly used in dialup connections, with the Ethernet protocol; and it supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway and can be used to enable all users of an office or home to share a common Digital Subscriber Line (DSL), cable modem, or wireless connection to the Internet. A Secure Shell or SSH server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway. A central database server 183 handles all of the database aspects of the system. For example, the database server 183 maintains and updates registries and status of connected digital endpoint devices, maintains and updates service configuration data, services specific data (e.g. indexes of backed-up files, other service specific indexes, metadata related to media services, etc.) and firmware configurations for the devices. The database server 183 may also store billing and transaction detail records and performance diagnostics. The database server logic 183 also satisfies all other database storage needs as will be described in greater detail herein.

Built on top of the system services layer 108 is the platform module layer 109. The platform module layer 109 provides a software framework for operating system and communications level platform functionality such as CPU management; Timer management; memory management functions; a firewall; a web wall for providing seamless WWW access over visual displays via access technologies enumerated herein, e.g. HTTP, SMS (Short Messaging Service) and WAP (Wireless Access Protocol); QoS management features, bandwidth management features, and, hard disk drive management features. The layered architecture 100 further provides a platform management layer 110 as shown in FIG. 5C, which together with the platform modules 109 implement the platform management layer/logic discussed earlier (with regard to FIG. 1).

The features/functions in the layer 110 include a platform manager module which will implement unique rules based notification services. On operational failure, for example, when one of the components or services fails, the platform manager would detect this failure and take appropriate action such as implement a sequence of rules to provide notification to a user. A scheduler module manages scheduled device maintenance, managing scheduled services, e.g. back-up services, etc. The layer 110 also includes a diagnostics module and a firmware upgrades management module for managing firmware upgrades. A resource management module manages system resources and digital contention amongst the various resources, e.g. CPU/Bandwidth utilization, etc. A display management module and a logger management module store and track gateway log-in activity of users and applications, e.g. voice call logs, at the user premises. The platform management layer 110 in concert with resource and service management components enforces the separation of network side managed service control and user side delegations depending upon service subscriptions and configurations. For example, the platform and resource management encompass rules and guidelines provided according to subscribed services that act to enforce, manage and control input/output operations, and use of hard drives space etc. A demarcation point, logically depicted as the Application Service Provider Demarcation in FIG. 5A, is thus defined that provides a hard line between what is owned by the customer and what is owned by the service provider.

The logical platform management layer 110 allows for inter-layer allocation of local resources. This function guarantees access between the application service/management logic implemented at the higher layers in the gateway device 10 and the applications service management function in the service management center 50, by assuring that the local user premises hardware and software modules are functioning at a required state (CPU and memory usage, bandwidth usage, QoS settings, etc.). The platform manager is also responsible for implementing that part of the managed application services to be performed by the gateway device. In that regard, the platform manager secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer must interface with all the layers above it and allow for bi-directional management information flow among all of the functions.

Referring to FIG. 5C, built on top of the platform management layer 110 is the Services Framework 120, which provides a library of application support service processes that facilitate data collection and data distribution to and from the multimedia endpoint devices. The application support service processes include, but are not limited to: an authentication manager for use in authenticating devices connected to the gateway device; a billing manager for collecting and formatting service records and service usage by endpoint devices, e.g. calls, back-up services etc.; a fault manager for detecting and managing determined system and/or service faults that are monitored and used for performance monitoring and diagnostics; a database manager; a control channel interface via which the gateway initiates secure communications with the operations support infrastructure; a configuration manager for tracking and maintaining device configuration; a user manager; a service manager for managing service configuration and firmware versions for subscribed services provided at the gateway device; and a statistics manager for collecting and formatting features associated with the gateway device. Statistics may relate to use of one or more services and associated time-stamped events that are tracked.

Built on top of the Services Framework layer 120 is the Application Services layer 130 providing library of user application services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The multi-services applications gateway 10 further provides application service interfaces 140 that are used to enable a variety of user applications and communications modalities.

For instance, the SIP Interface 141 is an interface to the generic transactional model defined by the Session Initiation Protocol (SIP) that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a Session Border Controller element in the service management center 50 (FIGS. 2 and 5A).

The Web Interface 142 enables HTTP interactions (requests and responses) between two applications. The Web services interface 149 provides the access interface and manages authentication as multi-services gateway devices access the service management center 50 (FIGS. 2 and 5A) via web services. The IM Interface 144 is a client that enables the multi-services gateway device 10 to connect to one or more specific IM network(s). As further shown in FIG. 5C, the UpNp (Universal Plug and Play) interface enables connectivity to other stand-alone devices and PCs from many different vendors.

The XMPP interface 145 is provided to implement the protocol for streaming (XML) elements via the gateway device 10, in order to exchange messages and presence information in close to real time, e.g. between two gateway devices. The core features of XMPP provide the building blocks for many types of near-real-time applications, which may be layered as application services on top of the base TCP/IP transport protocol layers by sending application-specific data qualified by particular XML namespaces. In the example, the XMPP interface 145 provides the basic functionality expected of an instant messaging (IM) and presence application that enable users to perform the following functions including, but not limited to: 1) Exchange messages with other users; 2) Exchange presence information with other devices; 3) Manage subscriptions to and from other users; 4) Manage items in a contact list (in XMPP this is called a "roster"); and 5) Block communications to or from specific other users by assigning and enforcing privileges to communicate and send or share content amongst users (buddies) and other devices.

Gateway Processing

For the in-home services, the multi-services gateway device 10 connects the various service delivery elements together for enabling the user to experience a connected digital home, where information from one source (for example, voicemail) can be viewed and acted on at another endpoint (for example, the TV 32). The multi-services gateway device 10 thus hosts the various in-home device interfaces, and facilitates the moving of information from one point to another. Some of the in-home endpoint device processing duties performed by the gateway device 10 include, but are not limited to: 1) detecting new devices and provide IP addresses dynamically or statically; 2) functioning as a (Network Address Translator) NAT, Router and Firewall; 3) providing a centralized disk storage in the home; 4) obtaining configuration files from the service management center and configuring all in-home devices; 5) acting as a Registrar for SIP-based devices; 6) receiving calls from and delivering calls to voice devices; providing voicemail services; 7) decrypting and securely streaming media having digital rights management (DRM) encoding; 8) distributing media to an appropriate in-home device; 9) compressing and encrypting files for network back-up; 10) backing-up files to the network directly from gateway device; 11) handling home automation schedules and changes in status; 12) providing in-home personal web-based portals for each user; 13) providing Parental Control Services (e.g. URL filtering, etc.); 14) creating and transmitting billing records of in-home devices including, recording and uploading multi-service billing event records; 15) distributing a PC client to PCs in the home, used in support of the various services such as monitoring events or diagnostic agents; 16) storing and presenting games that users and buddies can play; 17) delivering context-sensitive advertising to the endpoint device; and, 18) delivering notifications to the endpoint device; and, 19) enabling remote access through the web, IM client, etc. Other duties the gateway device 10 may perform include: service maintenance features such as setting and reporting of alarms and statistics for aggregation; perform accessibility testing; notify a registration server (and Location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device devices; and download DRM and non-DRM based content and facilitating the DRM key exchanges with media endpoints.

Service Management System Processing

While the gateway devices 10 as described above are each equipped with various logic and intelligence for service features that enable the gateway devices to provide various integrated digital services to the premises, the network-based elements of the service management center 50 support and manage multi-services gateway devices, for instance, so as to control the accessibility to functionalities and service features provisioned in the gateway devices and the ability to communicate with other gateway devices and various digital endpoint devices connected thereto. In a similar fashion, the service management center 50 may manage aspects of gateway operations as related to the wireless extender. For example, the service management center may communicate with the gateway device to facilitate its configuration of a wireless extender for a particular communication application and/or to support a particular application service enabled through the gateway device.

The service management center elements that support and manage the gateway devices 10, and possibly through them the wireless extender devices 500, comprise the ASM module described above with reference to FIG. 1. These ASM elements may, for example, provide the necessary data to the ASE and ASL modules so that they may carry out their respective functions, oversee the overall integration and communication among all the modules and the services that are managed by the ASM, manages the overall security and integrity of the ASD, and maintains alarm, statistical, subscription and provisioning data, and data necessary for the integration of services from third-party service providers, e.g., media content aggregators.

Examples of various ASM functionalities performed at the service management center 50, from the Service Provider Network regime, include but are not limited to: service initialization of the gateway devices, providing security for the gateway devices and the network support infrastructure, enabling real time secure access and control to and from the gateway devices, distributing updates and new service options to the gateway devices, providing service access to and from the gateway devices and remote access to the gateway devices, but not limited to such. In support of these services, the service management center 50 provides the following additional services and features: authentication; multi-service registration; subscription control; service authorization; alarm management; remote diagnostic support; billing collection and management; web services access; remote access to gateway devices (e.g. via SIP or Internet/web based communications); reachability to access challenged gateway devices; software updates; service data distribution; location service for all services; SIP VoIP service; media services; backup services; sharing services; provisioning; gateway interfaces to other service providers (Northbound and peering); load balancing; privacy; security; and network protection.

The logical network architecture for the service management center network 50 delivering these capabilities is illustrated and described in greater detail in U.S. Provisional Application No. 60/882,865 Filed Dec. 29, 2006 entitled "A MULTI-SERVICES APPLICATION GATEWAY AND SYSTEM EMPLOYING THE SAME," and of U.S. Provisional Application No. 60/882,862 Filed Dec. 29, 2006 entitled "SYSTEM AND METHOD FOR PROVIDING NETWORK SUPPORT SERVICES AND PREMISE GATEWAY SUPPORT INFRASTRUCTURE," and the disclosures of the service management center network and its operations from those applications are entirely incorporated herein by reference.

Extender Processing

Recall that for the in-home services, the multi-services gateway device 10 connects the various service delivery elements together for enabling the user to experience a connected digital home or office, where information from one source (for example, voicemail) can be viewed and acted on at another endpoint (for example, the TV 32). The extender device 500 assists the gateway device 10 in these functions. Like the multi-services gateway device 10, the extender device hosts various in-home device interfaces, and facilitates the moving of information from one point to another, directly or first relaying the information through the gateway device. In some configurations, the extender device may provide an interface to the wide area network. In other configurations, the extender facilitates a wireless link between the gateway device and one or more endpoint devices in the premises. The extender may also be configured to provide both the broadband link and the endpoint communications over the air to/from the gateway device.

As disclosed above, although the extender device serves as an interface extender for the gateway device and leaving many primary processing functions with the gateway device, some or all of these functions, including those enumerated above in paragraph [0076] [[this is auto-numbered]], may be distributed and assumed by the extender device.

Exemplary Deployments of the Extender Device

FIG. 6A illustrates one exemplary configuration of the WANB. In this configuration, the WANB/extender device 500 is used as FXS and FXO telephone adapters, a wired to wireless bridge, and a manager for an AC port 550. The WANB 500 connects to an analog telephone via an FXS interface (RJ11), and to a PSTN via an FXO port (RJ11). This configuration enables the application and network gateway (gateway device) 10, connected indirectly to the FXO via the WANB 500, to use the FXO port as a "local" telephone line whenever the analog telephone makes a local telephone call. This configuration also enables the application and network gateway 10 to control power to the AC port 550 such as switching the lamp on and off.

The WANB 500 is connected to the application and network gateway 10 via a WiFi interface. For the application and network gateway 10 to communicate with the extender device 500 and interact with endpoint devices, two separate sub-interfaces are created on this WiFi link. VLAN (virtual LAN) tags are used to separate the sub interfaces from each other at the application and network gateway 10. It will become apparent to those skilled in the art upon examination that other mechanisms may be used to achieve this separation and are within the scope of this disclosure. The two sub-interfaces are a LAN-subinterface and a WAN-subinterface. Ethernet frames communicated over the air in the premises, between the gateway device and the extender, contain a respective VLAN tag depending on the particular subinterface to which they relate. Frames going to/from the extender for the LAN-subinterface functionality have a VLAN tag for that interface. Within those frames, port IDs can be used to distinguish IP packets related to the FXO interface from those related to the FXS interface. Over-the-air, frames going to/from the extender for the WAN-subinterface functionality have a VLAN tag for that interface.

The LAN-subinterface is bridged off of the LAN segment of the application and network gateway 10. In effect, it is an extension of the Local Area Network segment that the application and network gateway 10 has created locally. The FXS interface is a member of the LAN-subinterface. This allows the gateway 10 to provide application services such as call processing and routing to the FXS interface, in effect providing that analog telephone with VoIP services. The FXO interface is also a member of the LAN-subinterface with FXO and FXS IP packets distinguished based on port IDs or other identifiers. The LAN-subinterface allows the gateway 10 to access the PSTN and provide application services (e.g. fax services) to the FXO interface.

Regarding the WAN interface, the Ethernet port (RJ45) of the WANB is connected to a data modem (Cable modem, DSL modem, a Fiber termination device, and so on) which provides data connectivity services (Internet). This in effect is the WAN interface used for connecting a residential router. The gateway 10 is the residential router in this example, but it is physically separated from the data modem (for example, the Data Modem is in the basement wiring closet, and the gateway 10 is in the den, next to computers and printers). The WANB uses the WAN-subinterface and the WAN vLAN to virtually connect the WAN interface to the gateway 10, in effect connecting the data modem to the gateway 10.

While the gateway 10 runs the routing and firewall applications locally and routing data between the LAN and WAN interfaces, the gateway 10 is also connected to the WANB, through the LAN-subinterface and can manage the AC output port as well. In the example illustrated in FIG. 6A, the interfaces that are part of the LAN-subinterface are the FXS, FXO, managed AC output, and the local WANB management interface (the same as the LAN-subinterface), the local LAN-subinterface IP address that the Gateway will use to manage the WANB. The RJ45 is a member of the WAN-subinterface and is bridged to the gateway 10.

Regarding control of electrical appliance (e.g. lamp), the gateway controls the electrical power flow to the AC output port 550 via the WANB. The WANB may detect the presence of an electrical appliance using any one of well know methods (e.g. circuit open/closed, current draw, voltage drop, and so on) and notifies the gateway device. The gateway, in turn, may incorporate this new device into its list of managed devices and control the power of the AC output port. This control includes switching the power on/off, varying the power available (dimmer function), monitoring for electrical surge, serving uninterruptible power supply functions, and so on. Further, the user may notify the gateway of the appliance as well as instruct the gateway how he wishes the appliance controlled.

FIG. 6B illustrates another example of a WANB configuration. In FIG. 6B, the extender does not use the RJ45 interface and the WAN-subinterface is not created. WANB 500 serves as an FXS and FXO wireless or wired telephone adapter with managed AC port. The application and network gateway 10 is connected directly to the Data Modem via an Ethernet interface. Subsequently, this results in the WAN interface coming from the application and network gateway 10. This allows the WANB 500 to be connected to the gateway 10 via either a WiFi interface or an Ethernet interface. There is no need to create any sub-interfaces as the WANB 10 is simply a part of the gateway's Local Area Network.

Figure 6C:
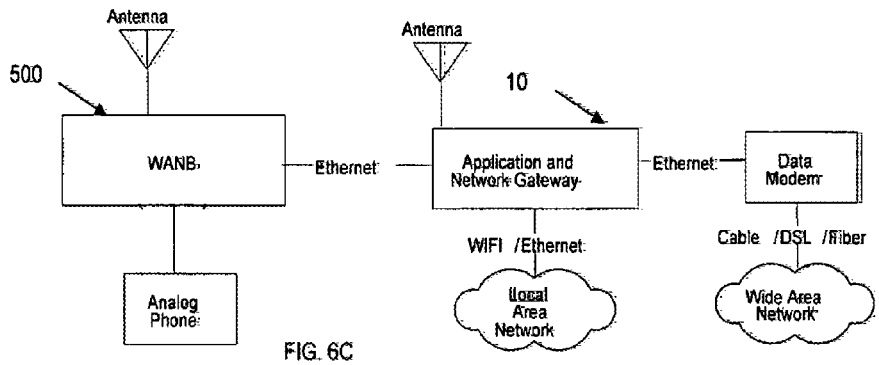
Figure 6D:
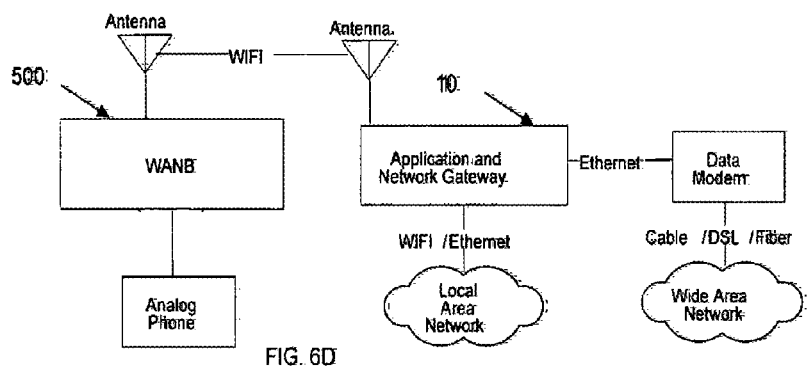
Figure 6E:
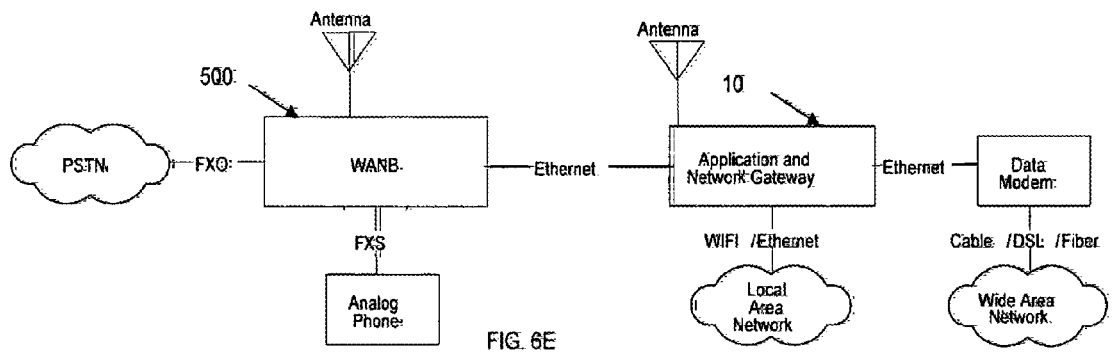

Other variations of WANB 500 configurations are possible as illustrated by FIGS. 6C-6G. Some of these variations include eliminating the FXO port all together or changing it to a second FXS interface. In FIG. 6C, the WANB 500 serves as a wired analog telephone adapter with one FXS. In FIG. 6D, the WANB 500 serves as a wireless analog telephone adapter with one FXS. In FIG. 6E, the WANB 500 serves as a wired analog telephone adapter with one FXS and one FXO. In FIG. 6F, the WANB 500 serves as a wireless analog telephone adapter with one FXS and one FXO.

In FIG. 6G, the WANB 500 serves as a wireless analog telephone adapter and bridge with one FXS. This configuration is similar to FIG. 6B, but without an FXO interface. The WANB 500 can serve as a wireless repeater of the LAN interface or LAN-subinterface. This option can be activated or deactivated based on the components used in the WiFi module. The wireless repeater function allows for the extension of the WiFi network of the gateway device 10. The repeater function can be utilized with or without direct connectivity of the Ethernet interface to the gateway 10.

In WANB configurations involving security device endpoints, the FXS port of the WiFi FXS module (or Ethernet cabled FXS) may be designed to interface with the twist pair networks of the Home Security Control Box. The module will convert an "alarm message call" from the Home Security Control Box to a "network message" and send the message to the gateway via WiFi or Ethernet cable networks. This allows the current in-house sensor interfaces to remain unmodified. The gateway will send alarm messages to a service provider or send alarm massages directly (email, auto generated voice call) to the home owners depending on the configuration.

Gateway and Extender Initialization

Figure 7:
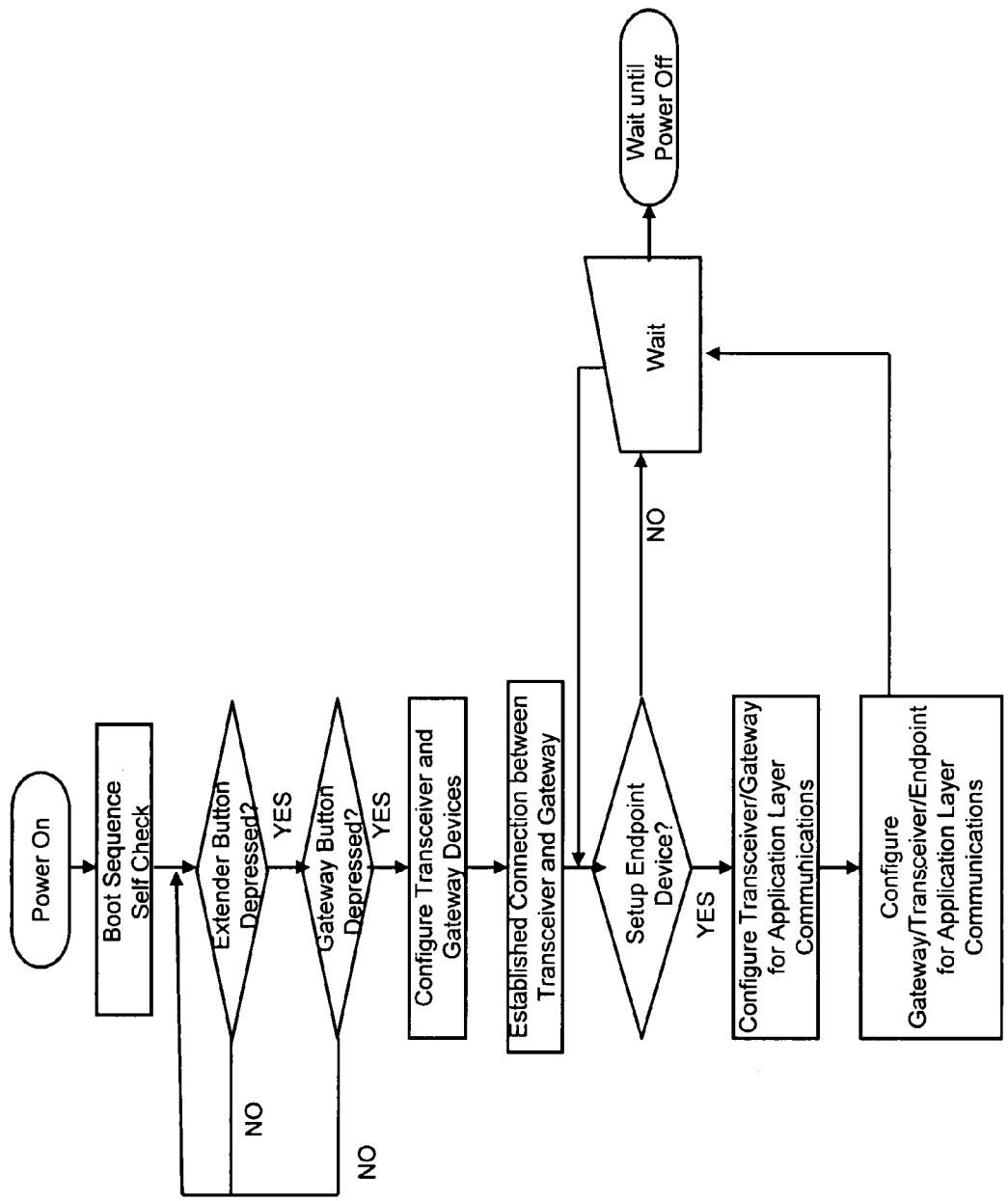
FIG. 7 illustrates aspects of an initialization technique for establishing an extender device's connection to and enabling communication with the gateway device.

Referring to FIG. 7, the extender device enables the gateway device to connect to and communicate with endpoint devices by establishing a connection to the gateway device. In the case of trusted services, the connection is often a secure connection. To establish the connection between the gateway and extender devices, in some embodiments, the WiFi protected setup standard is used. It should be apparent to those skilled in the art that the present teachings may be practiced with the gateway/extender connection established using other standards.

In the embodiments using the WiFi Protected Setup (WPS) standard (also known as "WiFi Simple Config" standard), the WPS standard prevents the gateway/extender devices and user home network from being exposed to attacks by configuring the WiFi Protected Access parameters of the network. The following description describes one (PBC method) of the four current WPS usage models although others may be used.

In setting up the extender device, the user begins by turning on the extender device. This is accomplished by plugging the extender into a power source (in some cases, the extender has a power switch). After the extender is turned on, the extender initiates its boot sequence. This may include loading instructions for initiating interrupts, for communication with the gateway device, checking device ports, checking device attachments, and so on.

When the user pushes synchronization buttons (the button may be either actual or virtual) on the gateway device and the extender device, the extender (transceiver) device and gateway device initiates a series of configuration routines to establish a WiFi connection. The WPS protocol defines three types of devices, the registrar, the enrollee, and the authenticator. Because the gateway device has authority to issue and revoke credentials in this network, it can be considered the registrar. The extender device is considered an enrollee seeking to join the gateway's wireless LAN network. Lastly, the network's authenticator who functions as a proxy between the Registrar and the Enrollee is located in the gateway device. Upon configuring the extender device and gateway device, a wireless link is established between the two devices. Because WPS is well known, the methods, procedures, components, and circuitry for establishing a WiFi network between the gateway and extender devices have been described at a relatively high-level, without detail, in order to avoid unnecessarily obscuring aspects of the present teachings.

However, the gateway/extender initialization does not stop upon establishing a WiFi connection between the two devices. Additional services (e.g. application layer services) can be, and in some cases, are configured and established automatically. The gateway communicates with the extender and queries the extender for information regarding services the extender would like set up. These services can be determined based on what endpoint devices (e.g. appliance or appliances) are connected to the extender. In some cases, these services can also be determined based on the extender's capabilities. To illustrate with an example, in the former scenario, a telephone attached to the extender would be detected and cause the extender to notify the gateway to set up telephone services. If telephone services are authorized, the gateway device would provide configuration data and/or programming to the extender 500 to configure the device for telephone operations. In a scenario involving connection of a data device to an extender port/interface, the extender having a data device connected to its RJ45 interface may signal to the gateway device to set up and allocate a series of IP addresses for communication with those devices.

After the gateway receives information for which additional services to setup automatically, the gateway proceeds with the setup accordingly. If necessary, the gateway device communicates with the service management center to determine if relevant application services are authorize and/or to obtain any additional configuration data or programming that may be needed for the particular extender set-up. The gateway sends configuration instructions for interfacing with the desired endpoint device to the extender device. Carrying out the configuration instructions, the extender enables the endpoint device to utilize the application layer communication between the wireless extender and the gateway device, effectively connecting the endpoint to the gateway device. To illustrate with an example, take the case of the extender device providing PBX/FXS services with an endpoint telephony device attached. After the gateway/extender has established a secure connection using WPS, the gateway queries the extender for additional services to setup. The extender requests the gateway to setup telephony services and the gateway proceeds accordingly. The gateway initiates and assigns a DHCP address to the telephony device, registers the endpoint for voice services, and authorizes the PBX application services. Because authentication has already been established during the WPS phase of the gateway/extender initialization, authentication can be assumed and thus, the telephony services setup can be automated without further user input. Upon authorization, the endpoint becomes a legitimate endpoint for voice services including VoIP. In some embodiments, the gateway also automatically makes the endpoint accessible to a soft switch in the network.

After the additional services have been attempted by the gateway (failure is permissible and further attempts can be made, depending on the system's configurations), the channel for WiFi communication between the gateway/extender devices remains open for future communications. When additional devices are connected to the extender, the extender notifies the gateway and authorization for the new endpoint device is treated in much the same way as if the new endpoint device were connected directly into the gateway device.

Aspects of the wireless extender 500, the gateway device 10 and interactions with various endpoint devices and with the service management center 50 have been described with reference to diagrams of methods, apparatus (systems) and computer program products. It will be understood that elements and functions illustrated in the diagrams, can be implemented by computer program instructions running on one or more appropriately configured hardware platforms, e.g. to operate as a gateway device 10, the wireless extender 500, or as one or more of the enumerated elements of the service management center 50. Hence, many of the operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of a "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device or associated modules thereof or any of the hardware platforms as may be used in the service management center, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from a software updater platform in the service management center 50 into a gateway device 10 or extender 500, or from another source into an element of the service management center 50. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

Those skilled in the art will recognize that the teachings of this disclosure may be modified, extended and/or applied in a variety of ways. An extension of the system architecture, for example, provides the ability of various and disparate third-party application service providers to provide multiple application services independently. Application services are managed by the "managed" service provider through the service management center 50, meaning, generally, authorizing, provisioning, and monitoring the usage of a particular application service. This can be accomplished in a variety of ways with varying degrees of involvement of, or coordination with, the service management center. The service management center 50 could manage these items "soup-to-nuts" or have minimal involvement. For example, the service management center 50 could deal directly with the third-party service provider to acquire application services at the request of a user and manage the delivery, authorization, usage-monitoring and upgrading of the application service. At the other end of the spectrum, the managed service provider may have arrangements with the third-party application service provider by which orders or requests from the users may come directly to the third-party application service provider, and services are delivered to the user by the third-party service provider who in turn coordinates with the managed service provider to register and monitor the particular application service placed in the gateway device 10. It should be noted that this ability to manage application services extends through the gateway device into the endpoint devices registered or associated with the gateway or network.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A device for enabling communication with a gateway device within a user premises, the gateway device controlling communication of one or more associated endpoint devices over a local area network and controlling access and communication to a wide area network to deliver an application service to the one or more associated endpoint devices, the device comprising:

a wireless transceiver interface for bidirectional wireless data communication at the local area network;

a wired interface for wired communication;

a processor coupled to the wireless transceiver interface and the wired interface for conversion and control of data communicated between the wireless transceiver interface and data communicated via the wired interface;

storage coupled to the processor; and programming executable by the processor contained in the storage, wherein execution of the programming causes the processor to receive instructions from the gateway device via the wireless transceiver interface or the wired interface to configure the processor to implement its conversion and communication control functions in a manner to communicate with the gateway device via the wireless transceiver interface, the wireless transceiver interface providing a single wireless interface link directly connecting the device and the gateway device, the single wireless interface link including i) a local area network link-layer sub interface that provides the gateway device access to the local area network through the device and ii) a wide area network link-layer sub interface that provides the gateway device access to the wide area network through the device, wherein the gateway device communicates with at least one of the one or more associated endpoint devices through the local area network link-layer sub interface, wherein the device is positioned logically between the wide area network and the gateway device.

2. The device of claim 1, wherein the one or more associated endpoint devices communicate with the gateway device via an endpoint interface, wherein the received instructions from the gateway device via at least one of the transceiver and the interface include instructions to configure the wireless device to:
conduct communications with the gateway device via the single wireless interface link;
route or bridge local area network communications to or from one of the endpoint devices via the endpoint interface across the local area network; and
route or bridge wide area network communications to or from one of the endpoint devices via the endpoint interface across the wide area network.

3. The device of claim 2, wherein wired interface communicating with one or more endpoint devices is configured to allow access to the local area network and the wide area network.

4. The device of claim 2, wherein (1) the local area network communications include communication for in-premises application services, (2) the wide area network communications include communication with the wide area network, and (3) the local area network communications is transmitted over a local area network vLAN and the wide area network communications is transmitted over a wide area network vLAN.

5. The device of claim 2, wherein the processor via the single wireless interface link is configured to conduct bidirectional communication with the gateway device for a first application service and a second application service over a single wireless interface link.

6. The device of claim 1, wherein the device further comprises a power interface configured to receive a plurality of voltage levels from a wall power adapter and deliver different voltage levels to one endpoint device interface.

7. The device of claim 1, wherein the device further comprises a power interface configured to receive a voltage and deliver a plurality of different voltage levels to the local device interface, the transceiver and/or the processor.

8. The device of claim 7, wherein the device further comprises a wall power adapter configured to plug into an electrical power outlet and supply one or more voltages to the power interface.

9. The device of claim 6, wherein the power interface configured to simultaneously receive the plurality of voltage levels from the wall power adapter and deliver at least two different voltage levels to at least two of the one or more associated endpoint devices.

10. The device of claim 1, wherein the wired interface is selected from the group consisting of: a RJ11 interface, a RJ14 interface, a RJ25 interface, a BS 6312 interface, a 4P4C interface, a RJ45 interface, an 8P8C interface, a mini RCA interface, and a FXS interface.

11. The device of 1, wherein the one or more associated endpoint devices communicate with the gateway via either the wireless transceiver interface or the wired interface.

12. The device of 1, wherein data communicated between the device and the gateway device using the single wireless interface link includes virtual LAN tags identifying the local area network sub-interface and the wide area network sub-interface.

13. A communication system for operation within a user premises to provide and manage services of one or more endpoint devices associated with the communication system, the communication system comprising:

a gateway device controlling communication of one or more associated endpoint devices over a wide area data network and controlling access and communication to a wide area network to deliver a plurality of application services to the associated endpoint devices, the gateway device comprising:
a first interface for enabling bi-directional network link-layer communications for the one or more of the endpoint devices via the local area network;
a second interface for enabling bi-directional network layer communications for the one or more endpoint devices via a wide area network;
storage coupled to a processor; and
programming in the storage for a plurality of application services, wherein, for each application service, execution of the programming by the processor causes the gateway device to provide server functions in relation to a respective service for one or more endpoint devices; and
an extender, comprising:
(a) a wireless transceiver interface and for wireless communication with the gateway device and the one or more endpoint devices;
(b) a wired interface for wired communication to the gateway device and the one or more endpoint devices local device interfaces, for wired connection to a communication device;
(c) a processor coupled to the wireless transceiver and the wired interface for conversion and control of communication between the wired interface and the wireless transceiver interface;
(d) storage coupled to the processor; and
(e) programming executable by the processor contained in the storage, wherein execution of the programming causes the processor to receive instructions from the gateway device via either the wireless transceiver interface or the wired interface to configure the processor to implement its conversion and communication control functions in a manner to communicate with the gateway device via the wireless transceiver interface, the wireless transceiver interface providing a single wireless interface link directly connecting the extender and the gateway device, the single wireless interface link including i) a local area network link-layer sub interface that provides the gateway device access to the local area network through the extender and ii) a link-layer wide area network sub interface that provides the gateway device access to the wide area network through the extender, wherein the gateway device communicates with at least one of the one or more associated endpoint devices through the local area network link-layer sub interface;
wherein the extender is position logically between the wide area network and the gateway device.

14. The communication system of claim 13, wherein:
the second interface of the gateway device further enables bi-directional communications with a service management center external to the user premises via the wide area network; and
the execution of the programming by the processor causes the gateway device to provide functions in relation to a respective service for one or more endpoint devices, including:
(1) application server communication with a client functionality of one or more endpoint devices, for the respective service, communicated on top of network layer communications of one or both of the interfaces;

(2) enforcement regarding authorization, authentication, configuration, or use of the respective service via the one or more endpoint devices; and (3) management of the application service based upon the communications with the service management center via the wide area network through the second interface.

15. The communication system of claim 13, wherein execution of the programming in the gateway device by the processor further causes the gateway device to support a plurality of different user interfaces via different endpoint devices, with respect to one or more services provided through the gateway device.

16. The communication system of claim 13, wherein the extender further comprises a power interface configured to receive a plurality of voltage levels from a wall power adapter configured to plug into an electrical power outlet.

17. An extender for extending communication of a gateway device within a user premises, the gateway device controlling communication of one or more associated endpoint devices over a local area network and controlling access and communication to a wide area network to deliver voice services to the associated endpoint devices, the extender comprising:

a wireless interface for communication to the one or more associated endpoint devices;

a wired interface for communication to the one or more associated endpoint devices;

a processor, coupled to the wireless interface and the wired interface, controlling communications between the wireless interface and the wired interface;

storage coupled to the processor; and programming contained in the storage executable by the processor, wherein execution of the programming causes the processor to receive instruction from the gateway device via either the wireless transceiver interface or the wired interface to configure the processor to implement its conversion and communication control function in a manner to communicate with the gateway device via the wireless interface, the wireless interface further providing a single wireless interface link directly connecting the extender and the gateway device, the single wireless interface link having including i) a local area network link-layer sub interface that provides the gateway device access to the local area network through the extender and ii) a link-layer wide area network sub interface that provides the gateway device access to the wide area network through the extender, wherein the gateway device communicates with at least one of the one or more associated endpoint devices through the local area network link-layer sub interface, wherein the extender is positioned logically between the wide area network and the gateway device.

18. The extender of 17, further comprising a wireless transceiver coupled to the processor and providing the wireless interface for bidirectional wireless data communication with the gateway device.

19. The extender of 18, wherein the processor manages the wireless transceiver.

\* \* \* \* \*